US012259851B2

(12) United States Patent
Sheen et al.

(10) Patent No.: US 12,259,851 B2
(45) Date of Patent: Mar. 25, 2025

(54) TESTING TEMPLATES USED FOR IMPLEMENTING INFRASTRUCTURE AS CODE

(71) Applicant: Salesforce, Inc., San Francisco, CA (US)

(72) Inventors: Zemann Phoesop Sheen, San Francisco, CA (US); Abhishek B. Waichal, Fremont, CA (US); Srinivas Dhruvakumar, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/104,139

(22) Filed: Jan. 31, 2023

(65) Prior Publication Data
US 2024/0256497 A1  Aug. 1, 2024

(51) Int. Cl.
*G06F 16/185* (2019.01)
*G06F 11/3668* (2025.01)

(52) U.S. Cl.
CPC ........ *G06F 16/185* (2019.01); *G06F 11/3688* (2013.01)

(58) Field of Classification Search
CPC ............................ G06F 11/3688; G06F 16/185
See application file for complete search history.

(56) References Cited

U.S. PATENT DOCUMENTS

| 5,634,098 A * | 5/1997 | Janniro ............... G06F 11/3688 |
| | | 714/E11.208 |
| 10,318,285 B1 | 6/2019 | Jodoin et al. |
| 10,320,625 B1 * | 6/2019 | Cherumbath ....... H04L 41/0806 |
| 10,334,058 B2 | 6/2019 | Frank et al. |
| 11,237,880 B1 * | 2/2022 | Raumann ................ G06F 9/544 |
| 11,392,366 B1 * | 7/2022 | Wiegley .................. H04L 67/34 |
| 2012/0180024 A1 | 7/2012 | Gonzalez et al. |
| 2013/0311164 A1* | 11/2013 | Katz .................... G06F 11/3684 |
| | | 703/28 |
| 2014/0281721 A1* | 9/2014 | Navalur .............. G06F 11/3684 |
| | | 714/33 |
| 2018/0048521 A1 | 2/2018 | Nair et al. |

(Continued)

OTHER PUBLICATIONS

Austel, P. et al., "Continuous Delivery of Composite Solutions: A Case for Collaborative Software Defined PaaS Environments," BigSystem '15, Jun. 2015, pp. 3-6.

(Continued)

*Primary Examiner* — Tarek Chbouki

(57) ABSTRACT

A system provides a framework for testing template code processed by a templating engine. A multitenant system may use template code for implementing Infrastructure as Code (IAC), for example, to generate pipelines for deploying software or provisioning resources for a datacenter configured in a cloud platform. The system sets the search path in a template engine environment object dynamically for each template file. The system allows testing of macros used by the template engine. The system converts the macros to callable entities that can be invoked by test cases. The system allows developers to finding code defects earlier and (Continued)

increase application availability. The system provides flexibility in testing and automation in running the tests. Furthermore, the system allows a separation of production code with unit tests.

20 Claims, 16 Drawing Sheets

(56) References Cited

U.S. PATENT DOCUMENTS

| | | | |
|---|---|---|---|
| 2018/0329738 | A1 | 11/2018 | Kasha et al. |
| 2018/0364985 | A1 | 12/2018 | Liu et al. |
| 2019/0095320 | A1* | 3/2019 | Biswas ............... G06F 11/3457 |
| 2019/0129712 | A1 | 5/2019 | Hawrylo et al. |
| 2019/0138288 | A1 | 5/2019 | Brealey et al. |
| 2020/0117434 | A1 | 4/2020 | Biskup et al. |
| 2020/0125344 | A1 | 4/2020 | Varghese et al. |
| 2021/0232388 | A1 | 7/2021 | Mirantes et al. |
| 2022/0012170 | A1* | 1/2022 | Mukherjee .......... G06F 11/3688 |
| 2022/0236976 | A1* | 7/2022 | Wiegley ................ G06F 8/71 |
| 2022/0253333 | A1* | 8/2022 | Rizzi .................... G06F 8/36 |
| 2022/0311795 | A1* | 9/2022 | Hutelmyer .......... H04L 63/1433 |

OTHER PUBLICATIONS

Burns, E. et al., "Continuous Delivery with Spinnaker," May 11, 2018, XP055626768, pp. 1-81.

Burns, E., "Why Spinnaker matters to CI/CD," Aug. 27, 2019, ten pages, [Online] [Retrieved on Jun. 25, 2021] Retrieved from the Internet <URL: https://opensource.com/article/19/8/why-spinnaker-matters-cicd>.

Mukherjee, J., "Continuous delivery pipeline 101: What is a continuous delivery pipeline?," Date Unknown, 14 pages, [Online] [Retrieved on Jun. 25, 2021] Retrieved from the Internet <URL: https://www.atlassian.com/continuous-delivery/pipeline>.

PCT International Search Report and Written Opinion, PCT Application No. PCT/US2021/015822, Jul. 15, 2021, 19 pages.

Thakur, V., "Continuous Delivery Pipeline for Kubernetes Using Spinnaker," May 27, 2020, 21 pages, [Online] [Retrieved on Jun. 25, 2021] Retrieved from the Internet <URL: https://www.metricfire.com/blog/continuous-delivery-pipeline-for-kubernetes-using-spinnaker/?GAID=undefined>.

United States Office Action, U.S. Appl. No. 17/112,974, filed Aug. 16, 2021, 30 pages.

* cited by examiner

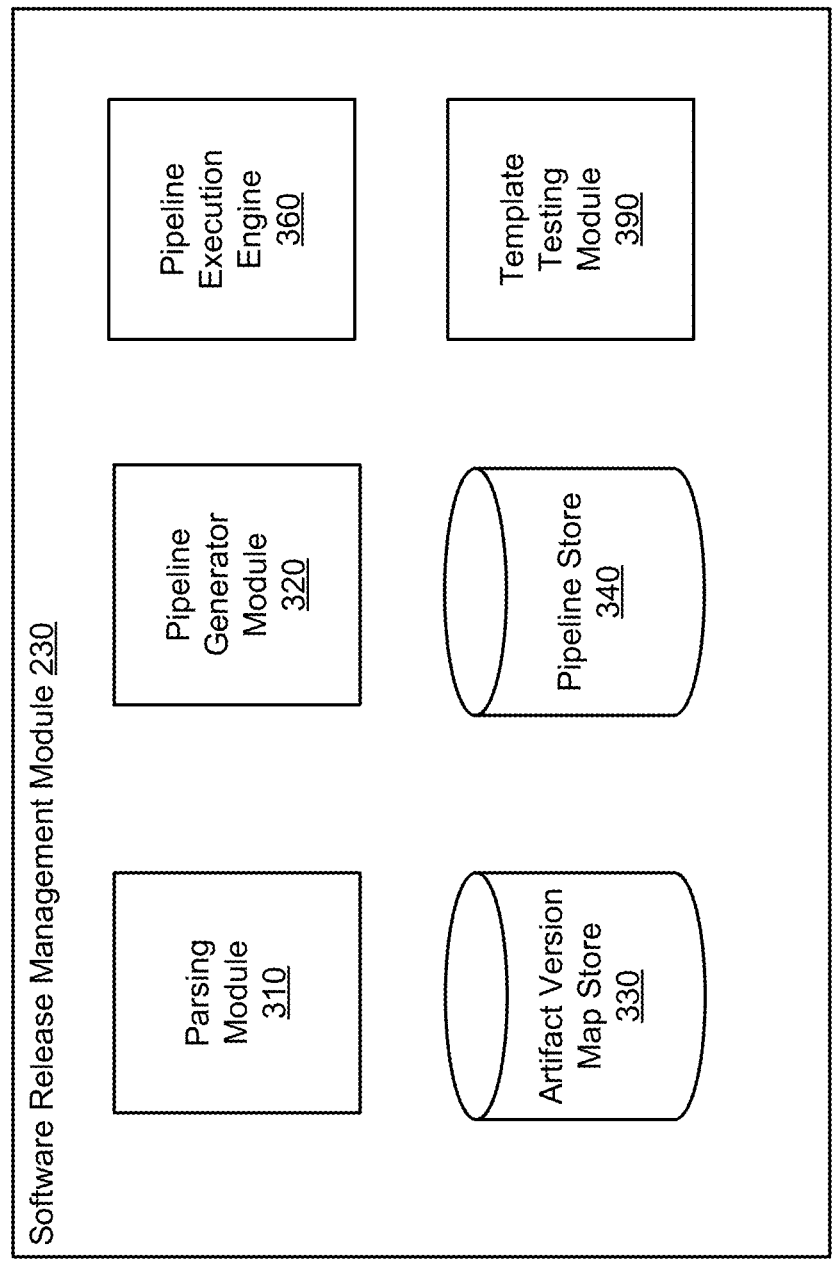

TESTING TEMPLATES USED FOR IMPLEMENTING INFRASTRUCTURE AS CODE

BACKGROUND

Field of Art

This disclosure relates in general to infrastructure as code (IAC), and in particular to testing of templates used for IAC, for example, generating pipelines for delivery of software artifacts in cloud platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Organizations maintain cloud infrastructure on cloud platforms using continuous delivery platforms that allow managing and provisioning of infrastructure through code. Such continuous delivery platforms allow organizations to simplify software deployment process and manage applications, firewalls, clusters, servers, load balancers, and other computing infrastructure on the cloud platform. However, deploying software releases for services provided on a cloud platform using a continuous delivery platform can be complex. For example, complex pipelines may be used for deploying software artifacts on cloud platforms. Often these pipelines are tested inadequately before being deployed on the cloud platform in a production environment. Inadequate testing results in increased likelihood of failures in production environment, leading to increased downtimes due to failures.

BRIEF DESCRIPTION OF DRAWINGS

FIG. 3 is a block diagram illustrating the architecture of a software release management module according to one embodiment.

Figure 1:
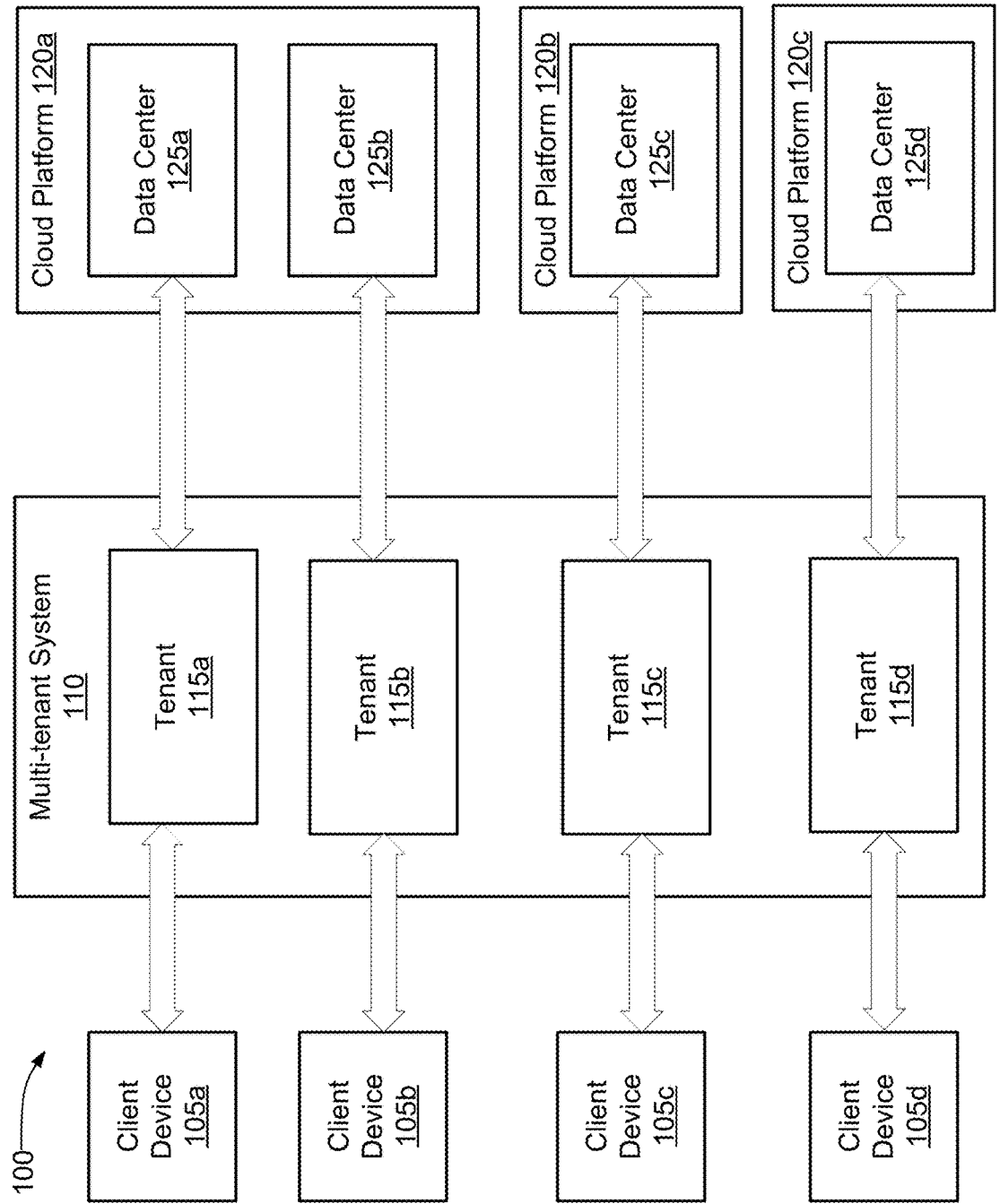
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments use infrastructure as code to create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on data centers configured on a cloud platform, for example, deploying software releases, provisioning resources, performing rollback of software releases, and so on. The system accesses a data center configured on a target cloud platform. The data center is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of data center defined by the declarative specification. The system executes the cloud platform dependent detailed pipeline on the target cloud platform, for example, to deploy software releases on data center entities of the data center. Techniques for deployment of software releases on datacenter configured in cloud platforms are described in the U.S. patent application Ser. No. 17/110,224 filed on Dec. 2, 2020, now issued as U.S. Pat. No. 11,349,958, each of which is incorporated by reference herein.

Systems uses pipeline templates for generating pipelines used for deploying and provisioning software on cloud platforms. Systems may use templating engines for generating pipelines from pipeline templates. An example of a templating engine is JINJA that may be used for IAC and numerous libraries and frameworks. A templating engine such as JINJA allows developers to write code in a fashion similar to a programming language such as PYTHON. The templating engine allows users to write code that includes placeholders. The placeholders are replaced with actual values to render a final document based on the template. The rendered document may be a pipeline used for deploying and provisioning software on cloud platform or may be any other type of document. Embodiments allow users to test template code processed by a templating engine such as JINJA. The techniques disclosed herein are illustrated in the context of IAC but may be applied to any type of template code processed by any templating engine.

Testing of the template code, for example, unit testing is cumbersome. Unit testing may be performed using the templating engine itself or using a unit testing framework, for example, a PYTHON unit testing framework such as PYTEST or UNITTEST. However, these techniques allow unit testing of simple template code. These techniques are either too cumbersome to use or inadequate when template code is used for performing complex operations.

A templating engine takes a static template file and replaces variables within the template file with values during runtime. A template file is a text-based file with placeholders in which the templating engine passes data to render a final document.

A templating engine may use an environment object that contains shared variables like configuration, filters, tests, global variable, and others. The environment object may be used to set parent directory/search path for imports, filters, and configurations.

A templating engine may allow filters to modify variables by formatting, filtering, and numerous other functionalities. A templating engine may support built-in filters, and allow developers to add custom filters to the environment to provide additional features.

A templating engine may support macros that include often used code. These macros can be used by different templates and get imported there using import statements. Macros are invoked like functions in regular programming languages.

A template processed by a templating engine may be any text file. A templating engine may use a search path to search for templates. A search path is a path, or list of paths, to a template directory that contains templates.

Testing of templating code processed by a templating engine is conventionally performed either by adding tests within the template code or by using unit test libraries of a programming languages such as PYTHON. Adding tests within the template code results in mixing of production code with tests, thereby possibly introducing additional defects in the template code. Testing template code using unit test libraries of programming languages such as PYTHON requires significant coding, for example, several thousand lines of code to test a macro due to various complexities. Due to these complexities developers may not perform unit tests of the template code, thereby testing the code in production which may lead to failures in productions resulting in downtime of systems such as datacenters deployed on cloud platforms.

A multitenant system may use templating engine for Infrastructure as Code (IAC), for example, to generate pipelines which host the logic for ordering pipelines based on service dependencies and other customizations to configure datacenters and various datacenter entities in a cloud platform. For such applications of templating engines, deploying code in production within sufficient unit testing of template code may introduce bugs that impact production builds and deployments.

Embodiments allow unit testing of template code processed by templating engines. The system saves significant coding effort in writing and running unit tests for template codes. This allows better testing of the template code, thereby ensuring reliability, confidence, and efficiency when delivering new features and making changes. Embodiments allow developers to be able to unit test, run integration tests, and debug applications and proactively fixing defects before production.

Therefore, embodiments allow developers to finding code defects earlier and increase application availability. The system provides flexibility in testing and automation in running the tests. Furthermore, the system allows a separation of production code with unit tests. The system allows developers to add custom filters and set variables to test macros and templates with minimal number of lines of code.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a data center that is created on a target cloud platform 120 and to perform operations using the data center, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the data center configured for the tenant. The multi-tenant system may implement different mechanisms for release and deployment of software for each tenant. A tenant may further obtain or develop versions of software that include instructions for various services executing in a data center. Embodiments allow the tenant to deploy specific versions of software releases for different services running on different computing resources of the data center.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
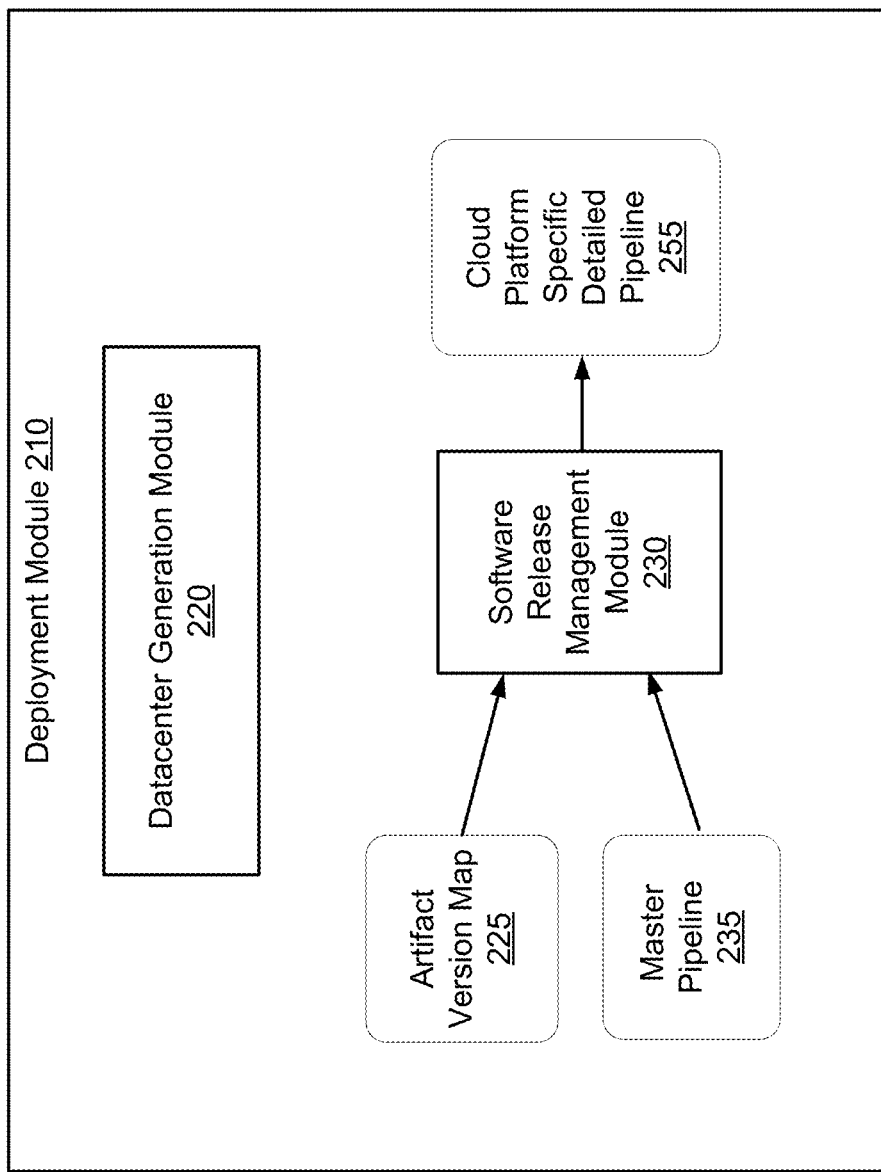
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on data center entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating data centers on the cloud platform. The software release management module 230 includes instructions for deploying software releases for various services or applications running on the data centers created by the data center generation module 220.

Figure 4:
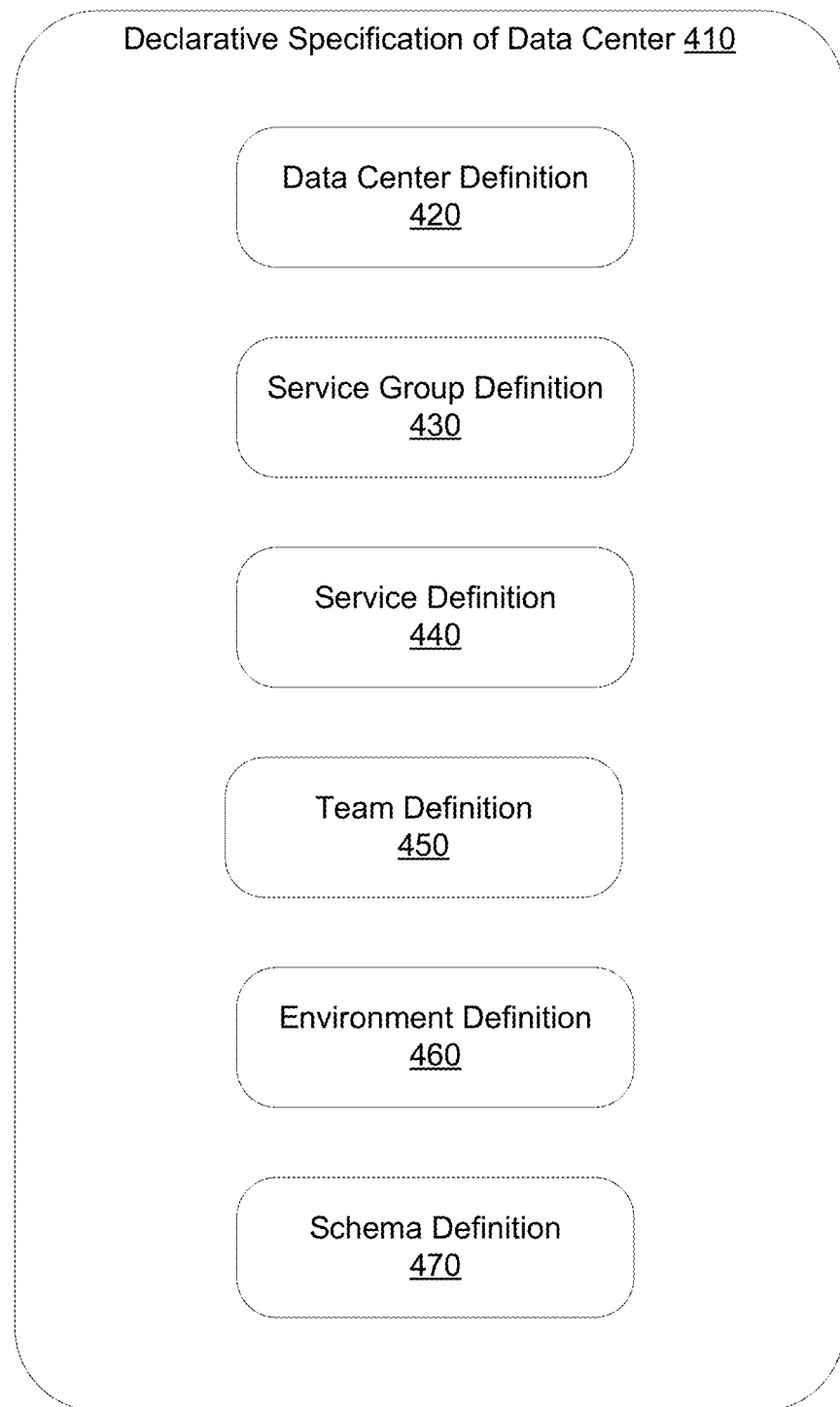
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of data center entities, where each data center entity may comprise one or more services, one or more other data center entities or a combination of both. FIG. 4 describes various types of data center entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific data center entities. The artifact version map 225 maps data center entities to software release versions that are targeted to be deployed on the data center entities. The master pipeline 235 includes instructions for operations related to software releases on the data center, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the data center entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on data center entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
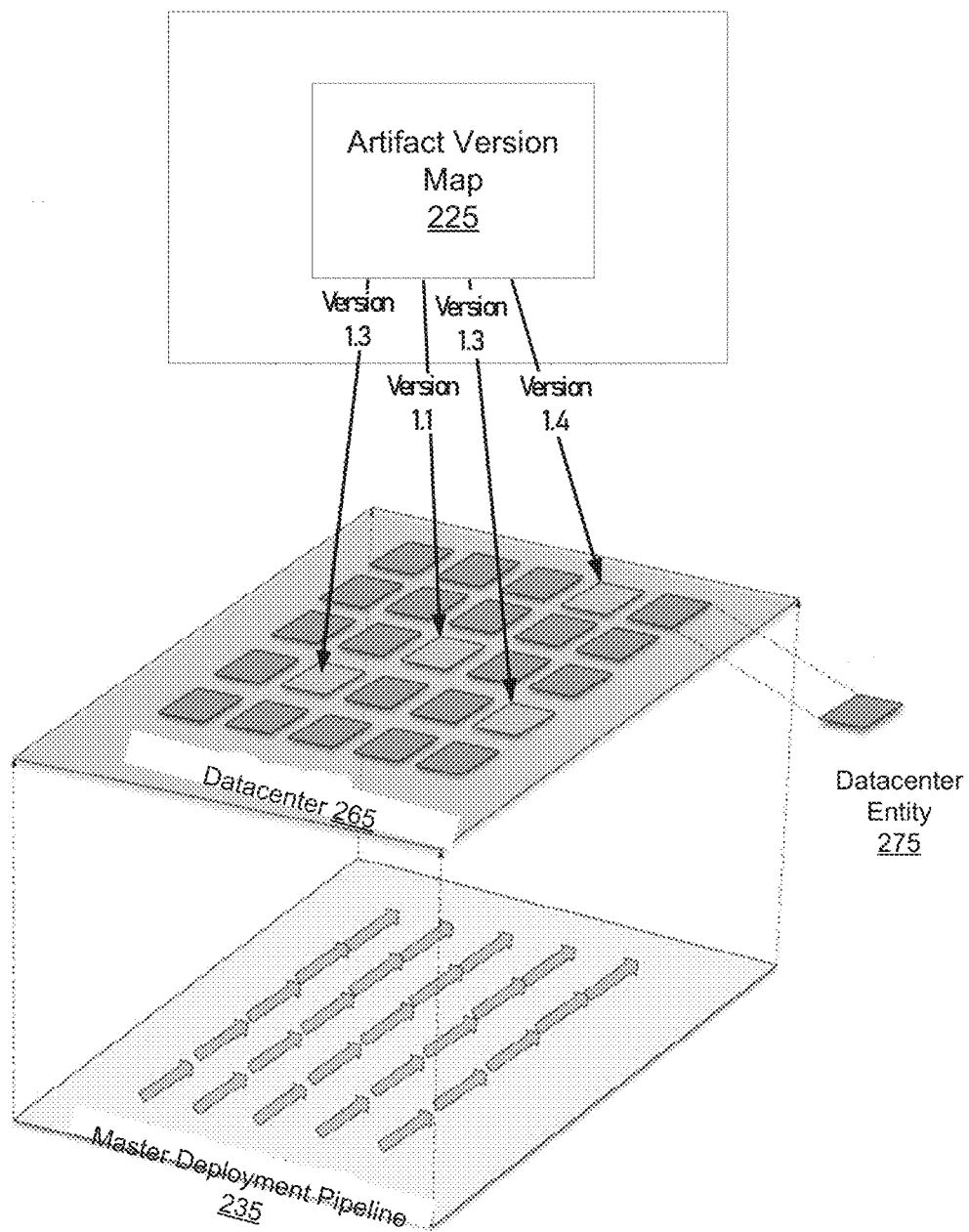
FIG. 2B illustrates the overall process for deploying software artifacts in a data center according to an embodiment.

FIG. 2B illustrates the overall process for deploying software artifacts in a data center according to an embodiment. FIG. 2B shows a layout of a data center 265 including various data center entities. As shown in FIG. 2B, the artifact version map 225 identifies the different versions of software that are targeted for release on different data center entities 275 of the data center 265. The master pipeline represents the flow of deployment artifacts through the various environments of the data center. The software release management module 230 combines the information in the master pipeline 235 with the artifact version map 225 to determine cloud platform specific detailed pipeline 255 that maps the appropriate version of software artifacts on the data center entities according to the artifact version map 225.

FIG. 3 is a block diagram illustrating the architecture of a software release management module 230 according to one embodiment. The software release management module 230 includes a parsing module 310, a pipeline generator module 320, an artifact version map store 330, a pipeline store 340, and a pipeline execution engine 360. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users and the pipeline store 340 stores master pipelines as well as pipelines generated by the pipeline generator module 320.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
```

-continued

```
        {
          "cluster_instance_name": " cluster3",
          "cluster_type": " cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": " servicetype1"
          "cluster_instance": "cluster1"
        },
        {
          "service_instance_name": "serviceinstance0003",
          "service_type": " servicetype2"
        },
        ...
      ],
      "service_teams": ["team1"],
      "type": "servicetype"
      "security_groups":[
        {
          "name":"group1",
          "policies":[
            {
              "description":"Allow access from site S1",
              "destination":{ "groups":[ "group2" ] },
              "environments":[ "dev", "test", "staging" ],
              "source":{
                "iplist":"URL1",
                "filters":[ filter-expression ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized_clients": [ ],
      "build_dependencies": [ ],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ...],
      "sub_services": [ "service1", " service2", " service3",   ...   ],
      "listening_ports":[
          { "protocol":"tcp", "ports":[ "53" ] },
          { "protocol":"udp","ports":[ "53" ] }
      "outbound_access":[
          {
            "destination":[
              {
                "endpoints":[ ".xyz.com:443", ".pqr.com:443" ]
              }
            ]
          }
      ],
    }
  ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
    "team_definition": [
        {
            "name": "team1",
            "description": "description of team",
            "admins": [
                "user1",
                "user2",
                "user3",
                "user4",
                ...
            ],
            "team_id": "id1",
            "owner": "owner_id",
            "email": "team1@xyz.com",
        }
    ],
    "communication_channel": "channel1"
    "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
    "data center_instance": {
        "environment": "env1",
        "data center instance_identifier": "id1",
        "name": "data_center1",
        "region": "region1",
        "service_groups": [
            "service_group1",
            " service_group2",
            " service_group3",
            "service_group4",
            ...
        ],
        "schema_version": "1.0",
        "admin_team":"admins",
        ...
    }
}
```

Figure 5:
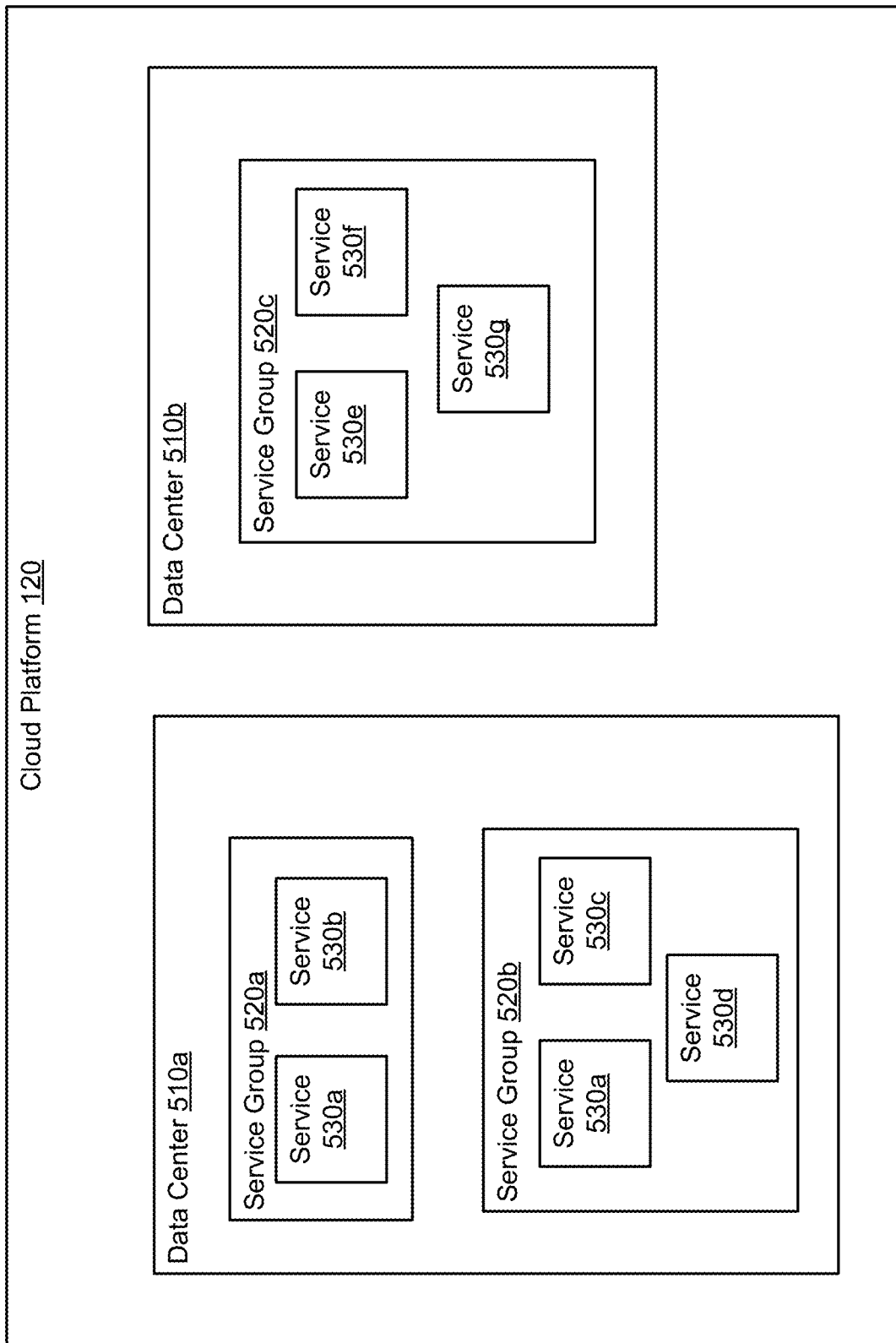
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

The data center generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
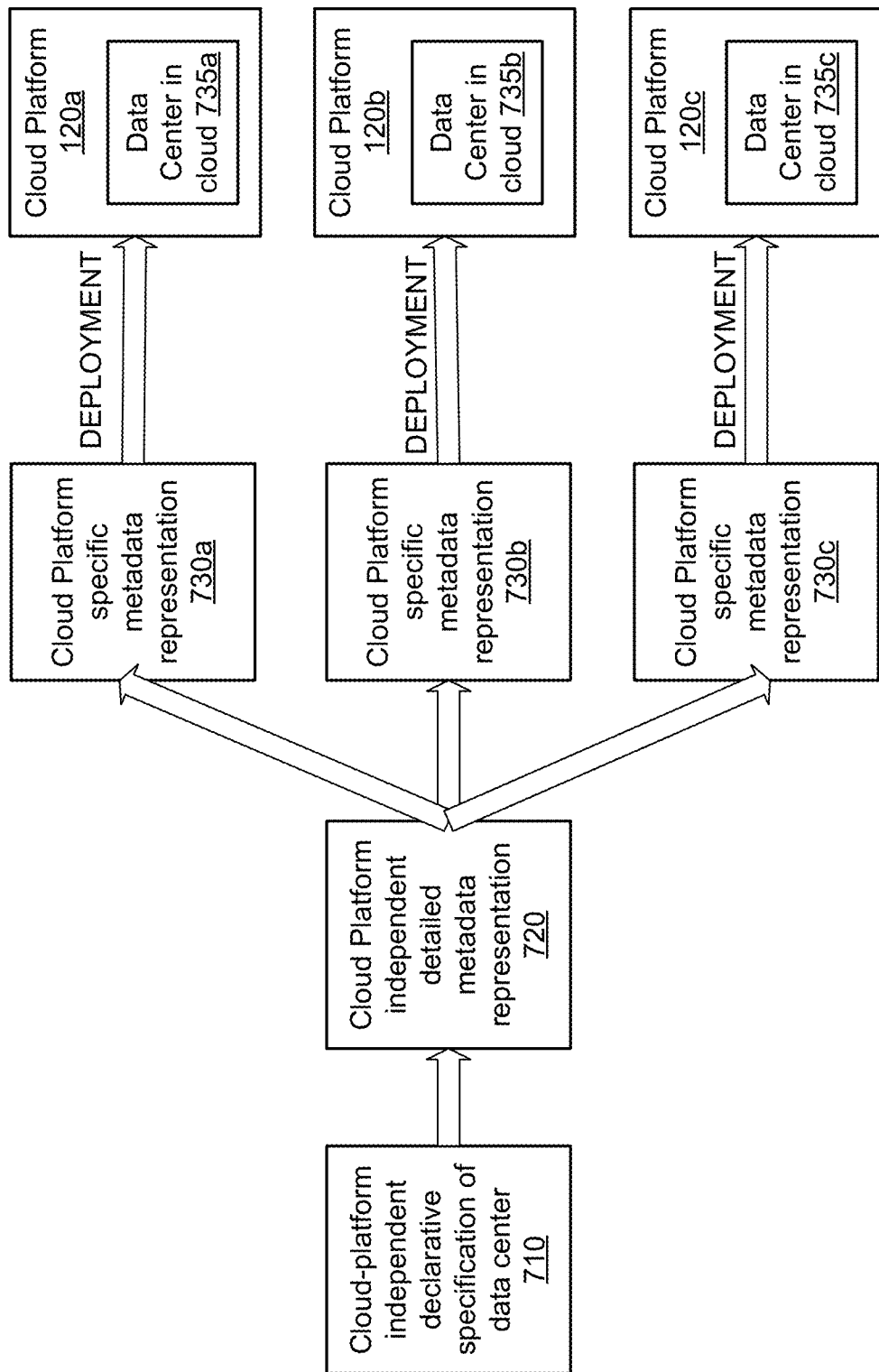
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Data Center

Figure 7:
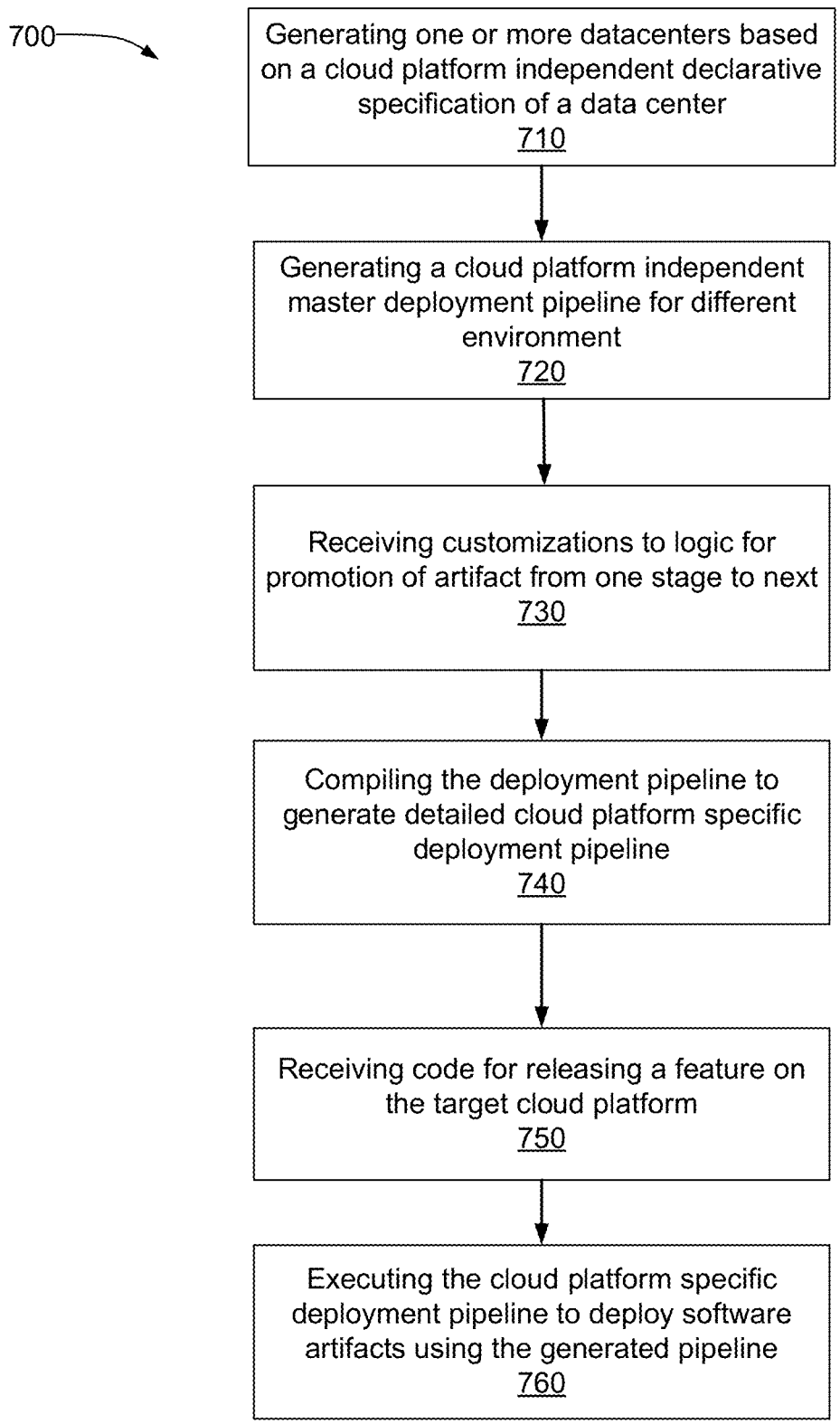
FIG. 7 shows the overall process for generating pipelines for deployment of software artifacts on data centers configured on a cloud platform according to an embodiment.

FIG. 7 shows the overall process for generating pipelines for deployment of software artifacts on data centers configured on a cloud platform according to an embodiment. The data center generation module generates 710 one or more data centers on a target cloud platform. Each data center is generated from a cloud platform independent declarative specification and has a hierarchy of data center entities.

The software release management module 230 generates 720 a cloud platform independent master pipeline. In an embodiment, the cloud platform independent master pipeline includes stages corresponding to environments of the data centers, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline mays be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific data center entities.

In an embodiment, each service deployed in the data center has a cloud platform independent master pipeline generated from the data center entities as defined by the declarative specification of the data center, for example, master pipeline for data center instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement data center instance owner-owned or release owner-owned on-demand deployment.

Certain portions of the master pipeline may be customized by the users, for example, by tenants of a multi-tenant system that are deploying services on a data center. For example, the promotion decision pipeline may be customized by a tenant to determine which test cases are executed and what the threshold is. The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of data center entities of each data center as specified by the cloud platform independent declarative specification for the data center.

The software release management module 230 further receives 750 code for releasing one or more features of services deployed on the data center. The software release management module 230 executes 760 the cloud platform specific detailed deployment pipeline to deploy software artifacts based on the received code.

Figure 8:
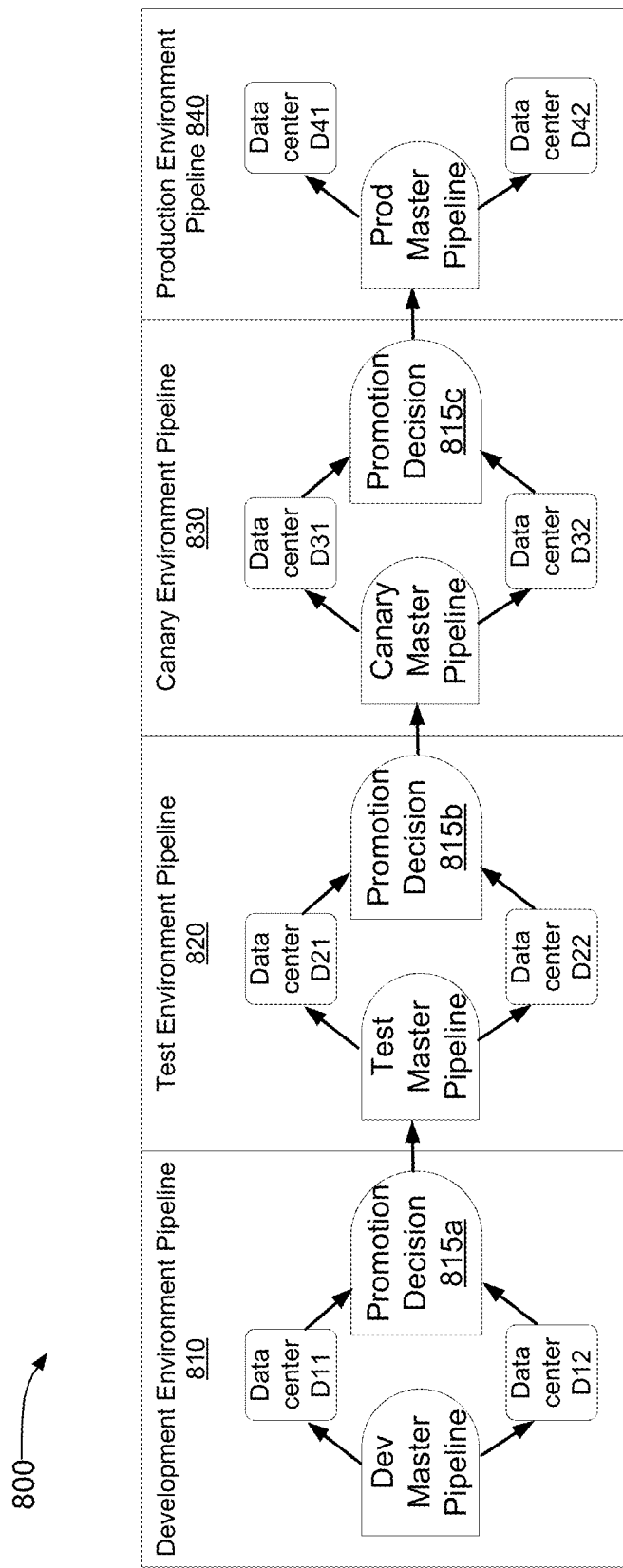
FIG. 8 illustrates an example master pipeline according to an embodiment.

FIG. 8 illustrates an example master pipeline 800 according to an embodiment. A master pipeline represents a sequence of stages that represent progressive conditional deployment across various data center environments. FIG. 8 shows stages for different environments of data center including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into data center pipelines D11, D12, . . . , depending on the number of data centers specified as having development environment in the declarative specification of the data centers.

The test environment pipeline 820 comprises a test master pipeline that feeds into data center pipelines D21, D22, . . . , depending on the number of data centers specified as having test environment in the declarative specification of the data centers.

The canary environment pipeline 820 comprises a canary master pipeline that feeds into data center pipelines D31, D32, . . . , depending on the number of data centers specified as having canary environment in the declarative specification of the data centers.

The production environment pipeline 820 comprises a production master pipeline that feeds into data center pipelines D21, D22, . . . , depending on the number of data centers specified as having test environment in the declarative specification of the data centers.

Each environment pipeline 810, 820, 830 includes a promotion decision pipeline 815*a*, 815*b*, 815*c* respectively. The outputs of the data center pipelines of the environment pipeline are collected by the promotion decision pipeline 815 that determines whether the software artifact is ready for promotion to the next stage. The promotion decision pipeline 815 may determine based on test case results obtained by the data centers whether the software artifact for the service is promoted to the next stage. For example, if more than a threshold number of test cases are executed successfully, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815*a* of development environment pipeline determines whether to promote the software artifact from development stage to test stage; the promotion decision pipeline 815*b* of test environment pipeline determines whether to promote the software artifact from test stage to canary stage, and the promotion decision pipeline 815*c* of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on data center entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more data centers. The software release deployment module 230 executes the aggregate pipelines for each service group of each data center. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
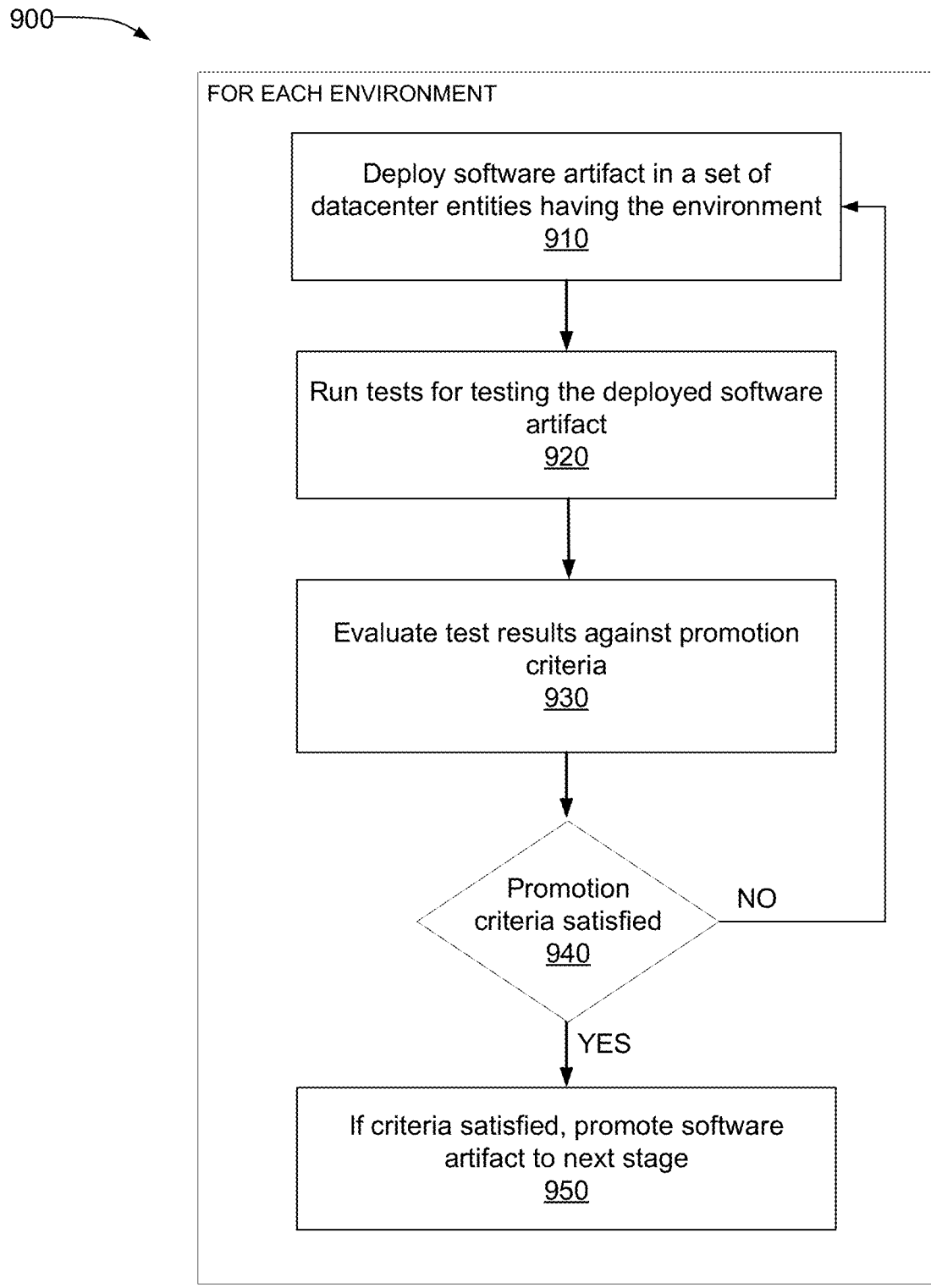
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of data center entities, for example, a set of data center entities specified as having the environment E. In an embodiment, the software artifact is generated by compiling source code for a service. The source code may be obtained from a version control software. The set of data center entities may include data center instances, service groups, cells, services, or any combination of these.

The environment pipeline for the environment E further includes instructions for running 920 tests for testing the deployed software artifact on the set of data center entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as child pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
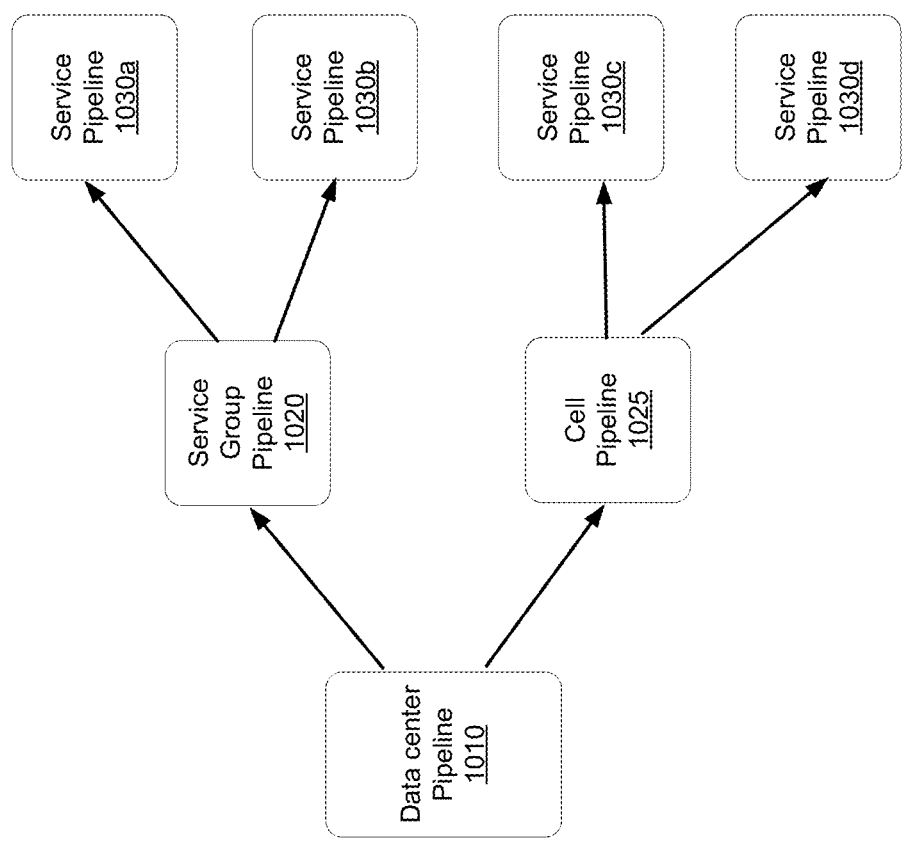
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the data center hierarchy. For example, the top level of the master pipeline represents a sequence of stages for different environments. Each environment may include one or more pipelines for data center instances or pipelines for other types of data center entities. A data center instance pipeline 1010 may include service group pipelines 1020. Each service group pipeline 1020 may include one or more service pipelines 1030. A data center instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The data center generation module 220 receives a cloud platform independent declarative specification for one or more data centers. The data center generation module 220 generates (or configures) data centers according to the received cloud platform independent declarative specifications. The deployment module 210 receives promotion decision 815 pipelines. The promotion decision 815 pipelines are integrated into the overall master pipeline.

The pipeline generator creates all pipelines for each data center from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates data center instance master pipelines to invoke service group pipelines; the pipeline generator generates a service master pipeline to invoke the data center instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
  "stages": [
    {
      "stage_name": "Artifact version map for service SVC",
      "stage_type": "version_map",
      "prior_stage_ids": [ ]
    },
    {
      "pipeline_type": "env-type-aggregate",
      "template_name": "deploy_dev.j2",
      "stage_name": "Deploy to dev env",
      "stage_type": "master_deployment_pipeline",
      "prior_stage_ids": [ " Artifact version map for service SVC" ]
    },
    {
      "promote_to": "test",
      "template_name": "promote.j2",
      "pipeline_type": "promotion",
      "stage_name": "Promote to test env",
      "stage_type": "promotion",
      "prior_stage_ids": [ "Deploy to dev env" ]
    },
    {
      "pipeline_type": "env-type-aggregate",
      "template_name": "deploy_test.j2",
      "stage_name": "Deploy to test env",
      "stage_type": "master_deployment_pipeline",
      "prior_stage_ids": [ "Promote to test env" ]
    },
    {
      "promote_to": "stage",
      "template_name": "promote.j2",
      "pipeline_type": "promotion",
      "stage_name": "Promote to staging env",
      "stage_type": "promotion",
      "prior_stage_ids": [ "Deploy to test env" ]
    },
    {
      "promote_to": "stage",
      "template_name": "promote.j2",
      "pipeline_type": "promotion",
      "stage_name": "Promote to staging env",
      "stage_type": "promotion",
      "prior_stage_ids": [ "Deploy to test env" ]
    } ...
```

As shown in the examiner master pipeline, the first stage is an artifact version map. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Testing Module Architecture

The system according to various embodiments allows testing of template code and macros used for rendering templates. The system performs testing using different parameters and allows various cases to be tested through the rendering of macros or templates multiple times in different test cases as defined by unit test functions. The system allows developers to test template code in a simple and familiar manner that renders the macros, set the templating engine environment, separate the test code from the template code being tested, run tests automatically with a single command. The system provides the flexibility of adding custom filters and set variables to test template macros and templates with minimal number of lines of code and time to promote testing.

If template code is not properly tested, defects in templates lead to failure in production code. This makes IAC code changes difficult to release to production. As a result, confidence and quality of the code may drop, and trust/repeatability of the IAC code or any other application being released to production diminishes. The system as disclosed provided the ability to test template code in an easy-to-use manner and supports critical features needed in testing such as assertions for the different output types, macro and template rendering, and so on.

Figure 11:
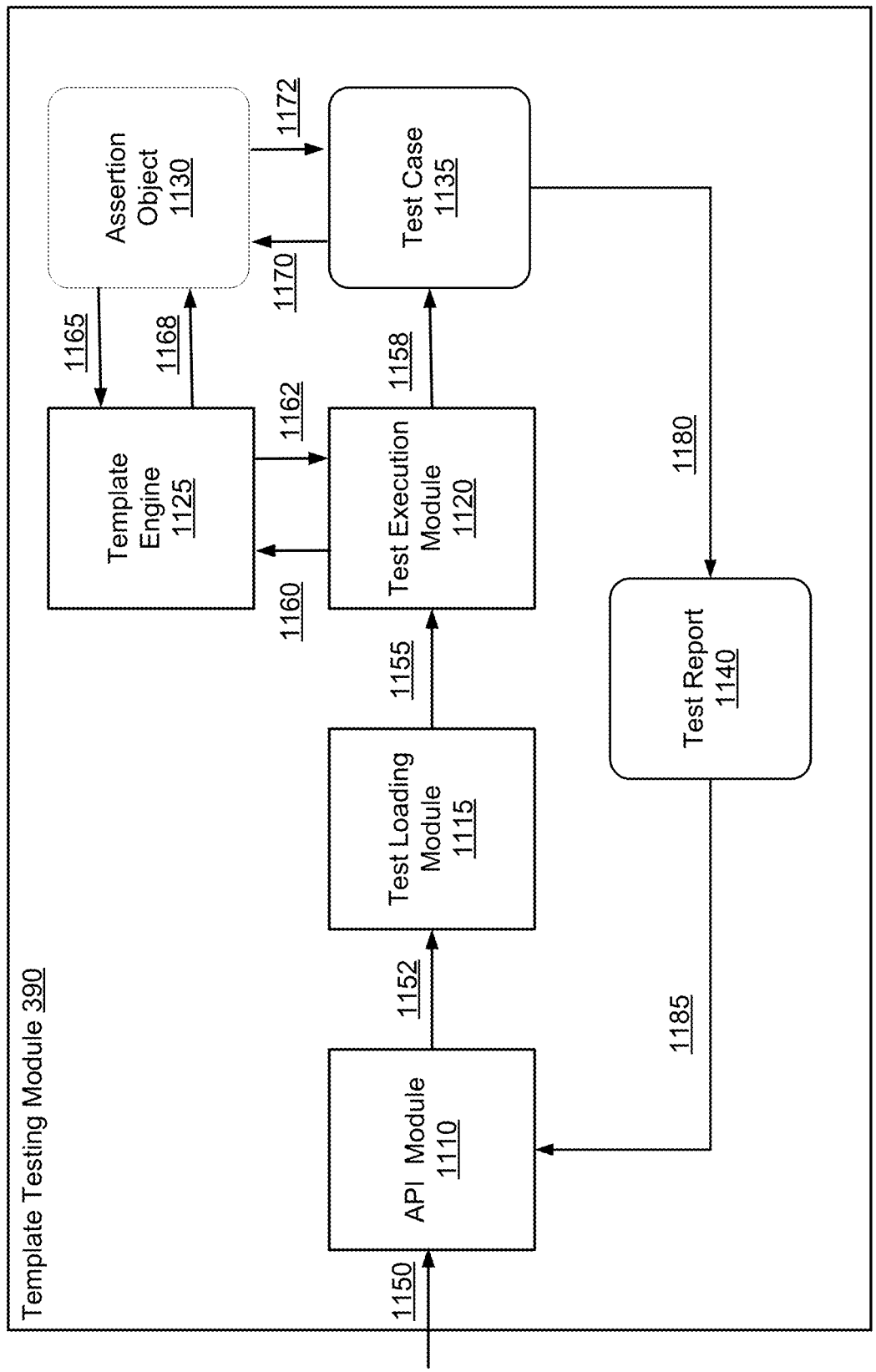
FIG. 11 illustrates the architecture and execution of a template testing module according to an embodiment.

FIG. 11 illustrates the architecture and execution of a template testing module according to an embodiment. The template testing module 390 includes an API module 1110, a test loading module 1120, and a test execution module 1120. Other embodiments may include more, fewer, or different modules. The template testing module 390 allows testing of template code and macros including unit testing and integration testing.

The API module 1110 allows users to invoke APIs to run tests. A user may run a single test or all tests under a particular directory in the file system. According to an embodiment, the template testing module 390 may run each test file independently and create an new environment object for each file.

The test loading module 1115 loads the tests specified by the user. The template testing module 390 finds a template code file corresponding to each test file. The template testing module 390 may use a search path to find the files.

The test cases 1135 are received from the user and test template code that is also received from the user. An assertion object 1130 provides the expected output of a test case and is compared with the actual output to determine whether the test case executed successfully. A test report 1140 includes the result of running a test case 1135.

The test execution module 1120 runs the tests. The test execution module 1120 runs the tests and collects all the test results and returns them to the user. The test execution module 1120 may return any failures with error messages and the difference between the actual output and the expected output.

The API module 1110 allows users to run single tests or instruct the system to run a set of tests stored as test files under a directory. The template testing module 390 receives 1150 an API request to run test cases. The API module 1110 identifies the test files that need to be run and adds 1152 them to a queue. The test loading module 1115 accesses the test cases from the queue and provides 1115 them to the test execution module 1120 for execution. The test execution module 1120 executes each file under a given directory identified by a user specified path. According to an embodiment, the test execution module 1120 identifies test files based on a naming convention. For example, all files that start with test or test_ are assumed to be test files. The test execution module 1120 interacts with the template engine 1125 to process a template file being tested.

The template testing module 390 creates an environment object for a test file. The template testing module 390 finds a template file corresponding to a test file based on the file structure as further described herein. The test execution module 1120 creates an environment object and sets 1160 a search path for the environment object. The template engine 1125 returns 1162 a template object generated from the template file. The test execution module 1120 runs 1158 the test case 1135. According to an embodiment, the test execution module 1120 converts the template file into a template object of a programming language, for example, PYTHON. The template object is used to run the tests. The test execution module 1120 converts macros into callable modules of the programming language. The test execution module 1120 looks up the macro from the template object and gets the macro as an attribute from the template object for executing the macro. The arguments may be passed as an array to the macro object and the template engine 1125 renders 1168 the macro output.

The test execution module 1120 checks 1170 assertions using the assertion object 1130. The assertion object 1130 invokes 1165 the templating engine to retrieve and render macros. The templating engine renders 1168 the macro output that is used to check 1170 the assertions. Since template engine output generated by rendering a template can be very long, both value assertions and file assertions may be provided as files so that a file name can be passed in based on the output type. If a file name is passed in, the test loading module 1115 determines the relative file path and gets the file as the correct type. Then assertions are executed to ensure the output of the template matches the expected output. The test execution module 1120 may perform data cleaning of the output based on the output type (JSON, HTML, YAML, String, etc.) for comparing with the expected output.

The result of the assertion is received 1172 and used by the test execution module 1120 to generate 1180 a test report 1140 that is provided 1185 to the API module 1110 for returning as the result of execution of the test cases. Accordingly, all the test results are collected and returned to the user. Any failures may be returned with a detailed error message and what the difference was between the actual macro output with the expected value. According to an embodiment, the template testing module 390 performs integration testing and end-to-end testing.

Following is an example test file. The test file defines various tests, for example, test_cell_level, test_fd_level, test_datacenter_level, test_cell_request_meta, and so on. Other tests may be defined.

```
import j2test
class TestContext(j2test.TestTemplate):
    macro_orch_level = "get_orchestration_level"
    macro_orch_request_meta = "get_orchestration_request_meta"
    # For get_orchestration_level
    def test_cell_level(self):
        data = { "std": { "pipeline": { "domain": "target_domain_name",
"cell": "target_cell name" }}}
        args = [data]
        self.assertEqualString(self.macro_orch_level, args, "CELL")
    def test_fd_level(self):
        data = { "std": { "pipeline": { "domain": "target_domain_name",
"cell": "NONE" }}}
        args = [data]
        self.assertEqualString(self.macro_orch_level, args, "FD")
    def test_datacenter_level(self):
        data = { "std": { "pipeline": { "domain": "NONE", "cell":
"NONE"}}}
        args = [data]
        self.assertEqualString(self.macro_orch_level, args, "FI")
    # For get_orchestration_request_meta
    def test_cell_request_meta(self):
        data = self.loadYamlFile('../../variables/jtest_context_vars.yaml')
        args = [data, "some_pipeline_type"]
        expected = {"case_pipeline_types": "some_pipeline_type",
"cell_inst_name": "target_cell_name", "fd_inst_name":
"target_domain_name", "fi_env_type": "test123", "fi name":
"devmvp", "level": "CELL", 'operation': 'create'}
        self.assertEqualJson(self.macro_orch_request_meta, args, expected)
if __name__ == '__main__':
    TestContext( ).run( )
```

An exemplary template file corresponding to the test file is as follows. The template file defines several macros, for example, get_orchestration_request_meta macro that collects metadata related to an orchestration request, get_orchestration_level macro that determines aggregate orchestration pipeline type i.e., determines if a pipeline is an aggregate orchestration pipeline for a datacenter entity.

```
{% macro get_orchestration_request_meta( vars, relevant
pipeline_types) %}
  {#
    Collect metadata related to an orchestration request.
    :param vars: Template variables passed to all pipelines containing
general context & orchestration request context
      :type vars: dict
    :return: Metadata related to orchestration request.
      :rtype: dict
  #}
  {% set orchestration_level = get_orchestration_level(vars) | trim %}
  {% set orchestration_operation =
get_operation(relevant_pipeline_types) | trim %}
  {% set request_context = {
      "level": orchestration_level,
      "case_pipeline_types": relevant_pipeline_types,
      "fi_name": vars.std.pipeline.falcon_instance.name,
      "fi_env_type":
vars.std.fire.raw.falcon_instance.environment_type,
      "operation": orchestration_operation
    }
  %}
  {% if request_context.level == "FD" %}
    {# set orchestrated functional domain specific metadata #}
    {% do request_context.update(
      { "fd_inst_name": vars.std.pipeline.domain }
    )
    %}
  {% endif %}
  {% if request_context.level == "CELL" %}
    {# set orchestrated cell specific metadata #}
    {% do request_context.update(
      {
        "fd_inst_name": vars.std.pipeline.domain,
        "cell_inst_name": vars.std.pipeline.cell
      }
    )
    %}
  {% endif %}
  {# implicit return #}
  {{ request_context | tojson }}
{% endmacro %}
{% macro get_orchestration_level( vars) %}
  {#
```

Simple function to determine aggregate orchestration pipeline' type i.e. determine if the pipeline in question is an aggregate orchestration pipeline for a datacenter entity
:param vars: Template variables passed by pipegen to all pipelines containing general context & orchestration request context

```
    :type vars: dict
    :return: List of dictionaries holding subset of information of cells
within "functional_domain_name" FD
    :rtype: list
  #}
  {% set pipeline = vars.std.pipeline %}
  {% set orchestration_level = "FI" %}
  {% if pipeline.cell != "NONE" %}
    {% set orchestration_level = "CELL" %}
  {% elif pipeline.domain != "NONE" %}
    {% set orchestration_level = "FD" %}
  {% endif %}
  {{ orchestration_level }}
{% endmacro %}
```

The sample test code and templates are exemplary and other test cases and templates can be processed by the system.

Testing Pipelines for Datacenters Deployed on Cloud Framework

The template testing module 390 may be used for testing of applications of a templating engine. An example of use of template testing module 390 is for testing of pipeline templates used for generating pipelines used for configuring datacenters on cloud platform and for deploying software artifacts or provisioning resources on datacenters configured on cloud platforms.

Figure 12:
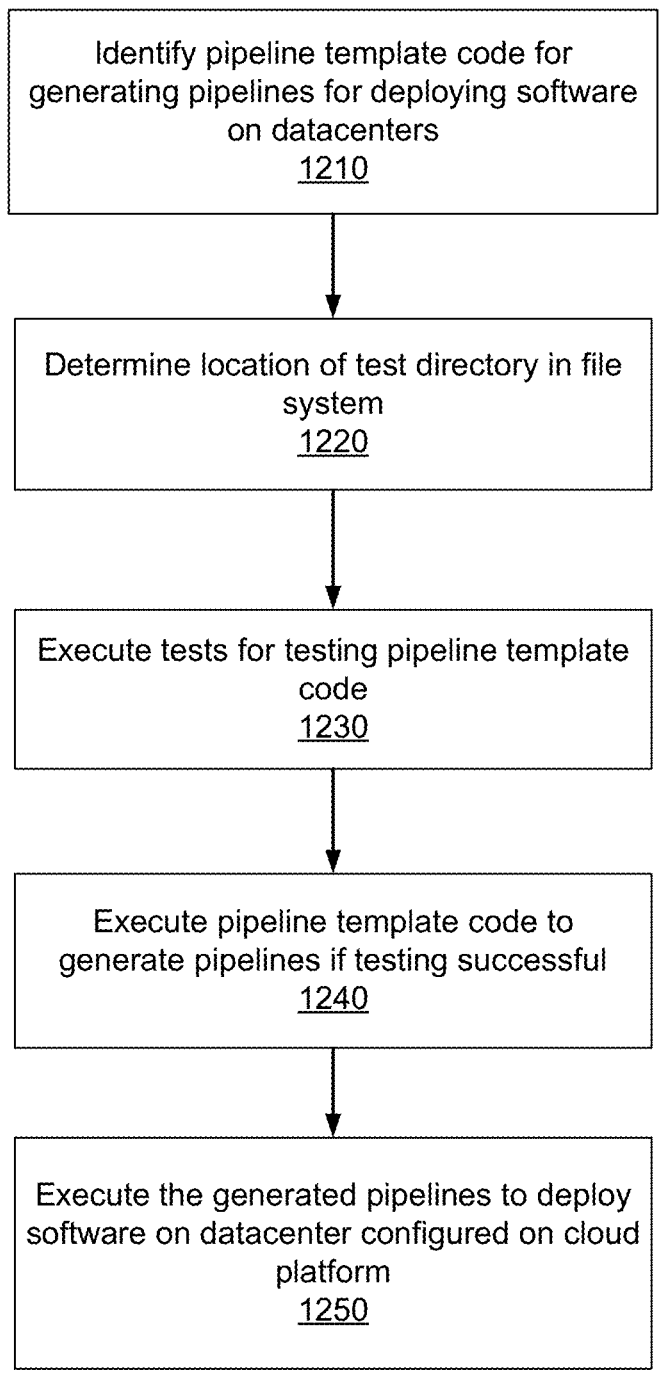
FIG. 12 shows a flowchart illustrating the process of testing pipeline templates for deploying software on datacenters configured on a cloud platform according to an embodiment.

FIG. 12 shows a flowchart illustrating the process of testing pipeline templates for deploying software on datacenters configured on a cloud platform according to an embodiment. The steps are indicated as being performed by a system and may be performed by modules of systems, for example, the multi-tenant system 110 and cloud platform 120 as shown in FIG. 1 such as the deployment module 210 and the software release management module 230.

The system identifies 1210 pipeline template code for configuring datacenters on a cloud platform, generating pipelines for deploying software on datacenters configured on a cloud platform or for provisioning resources on datacenters configured on a cloud platform. According to an embodiment, a user may specify the location of the pipeline template code, for example, by specifying a directory in a file system that includes pipeline template code. The user may identify the directory by using it as the current directory for executing a command for running test cases.

The system determines 1220 the location of the test files, for example, by identifying a test directory that stores the test files corresponding to the pipeline template code. The process for identifying the location of the test files is further described herein. The template testing module 390 of the system executes 1230 tests for testing the pipeline template code. These may be unit tests or integration tests. If the tests are executed successfully, the system executes 1240 the pipeline template code to generate pipelines, for example, using a template engine such as JINJA. The system executes the generated pipelines to perform the requested task, for example, configuring a datacenter on a cloud platform, deploy software on datacenters configured on a cloud platform or provision resources on datacenters configured on a cloud platform.

Template Discovery for Testing

The system automatically determines the search path used for a template file. The system sets the search path in a template engine environment object dynamically for each template file. This allows for template file imports to work correctly by setting the appropriate environment parent directory so that various macros and templates from the imported template file may be used. If the search path is not set correctly, the template imports fail and any template files with imports cannot be tested. A developer may hard code the search path for each template file in the environment for the templating engine. This is cumbersome and error prone. Furthermore, if the search path needs to be changed for any reason, several hundred template files may have to be modified. Therefore, setting this environment path correctly is required for executing the test cases correctly since only template files within the specified search path set in the environment object of the template engine are accessible to the current template file.

According to an embodiment, the system searches for template files and when a template file is found, the system sets the environment path to a directory that is one level above the current template file so that resources and other template files referenced in the current template file can be used. The system uses a file and directory naming convention to determine the search path.

In the following exemplary directory structure, the template files having the file extension j1 are in the same directory "parent_folder" as the PYTHON test file with file extension py.

```
parent_folder
    app1.j2
    app2.j2
    jtest_app.py
```

In this configuration, the system sets the search path to the parent directory, i.e., "parent_folder" of both template files. This allows template app1.j2 to import any macro from template app2.j2.

In the following exemplary directory structure, the test files are stored in a test directory "jtests" that is at the same level as the directory "src" storing the templates. In this configuration, the system sets the search path to the "src" folder containing all the template code, i.e., the j2 files.

```
src/
    __init__.py
    appmodule.j2
    module1/
        part1.j2
        part2.j2
        ...
jtests/
    src/
        jtest_appmodule.py
        module1/
            jtest_part1.py
            jtest_part2.py
            ...
```

In the following directory structure, the test directories are included in the same directory as the template files, i.e., the test directories are inlined in the application package. In this configuration, the system determines the search path for each template file and sets it.

```
src/
    __init__.py
    appmodule.j2
    jtests/
        jtest_appmodule.py
    module1/
        part1.j2
        part2.j2
        jtests/
            module1/
                jtest_part1.py
                jtest_part2.py
                ...
```

The system automatically discovers and sets the template search path during the creation of the Environment by using the test directory structure. This is beneficial for the developer as it allows the developer to implicitly and easily set the template search path by reflecting the template code structure with the test files flexibly with any template project structure. For certain template engines, setting the correct environment is cumbersome and error prone and has to be done for each template file. For complex template application such as generation of pipelines for complex configurations of datacenters on cloud platforms, the system improves the usability of the pipeline generation process significantly by setting the search path for each template file automatically.

Figure 13:
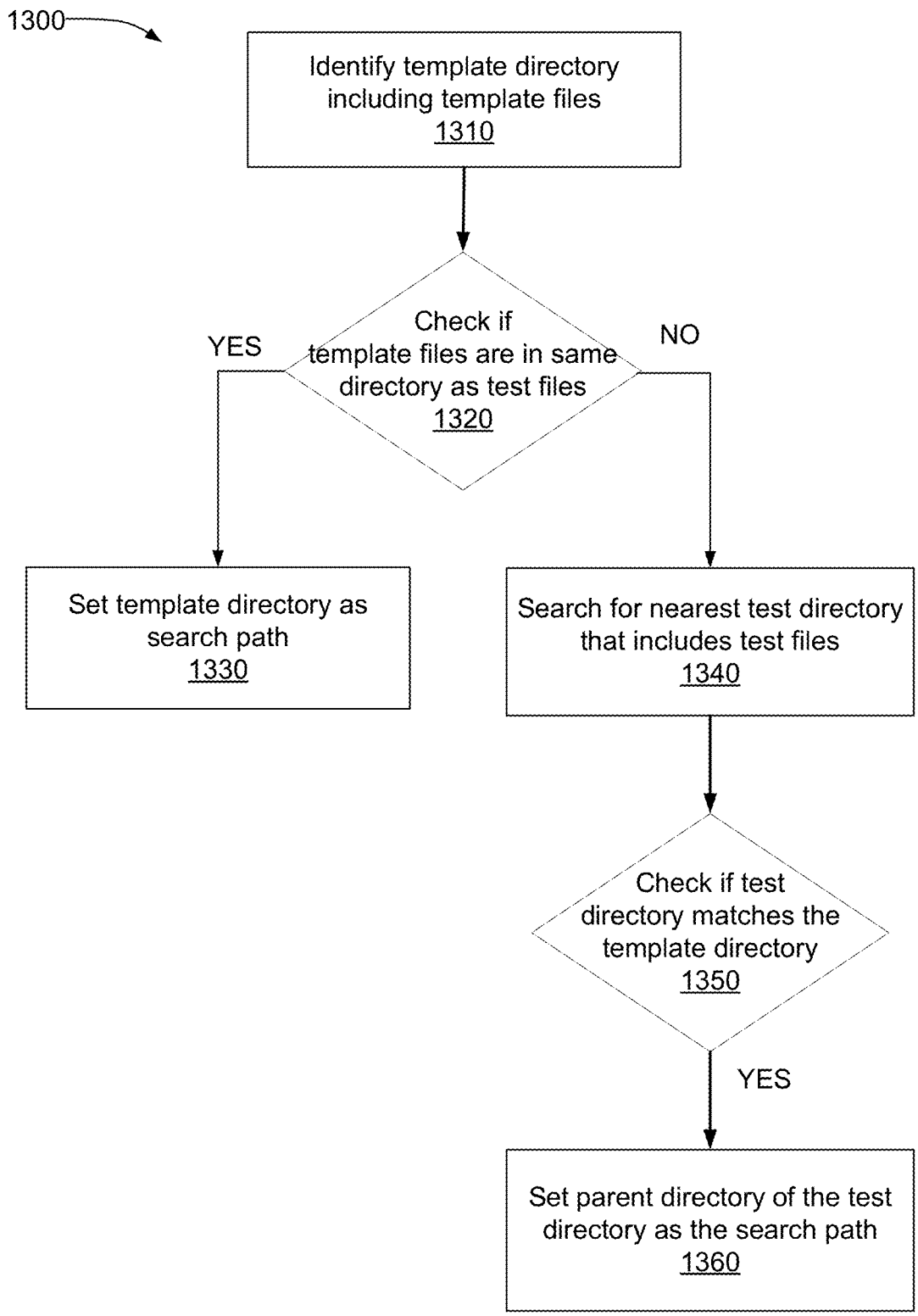
FIG. 13 shows a flowchart illustrating the overall process for discovery of the search path for setting the environment for testing of templates processed by a template engine according to an embodiment.

FIG. 13 shows a flowchart illustrating the overall process for discovery of the search path for setting the environment for testing of templates processed by a template engine according to an embodiment. The steps are indicated as being performed by a system and may be performed by modules of systems, for example, the multi-tenant system 110 and cloud platform 120 as shown in FIG. 1 such as the deployment module 210, the software release management module 230, or the template testing module 390.

The system identifies 1310 a template directory that stores the template files storing the template code being tested. The template directory may be specified by the user, for example, by running the test command in the template directory such that the template directory is the working directory. The system checks 1320 if the template files are in the same directory as the test files. If the template files are in the same directory as the test files, the system sets 1330 the template directory as the search path in the environment used by the template engine.

If the template files are not in the same directory as the test files, the system searches for a test directory that includes the test files. The system may search the test directory in the neighborhood of the template directory, where the neighborhood is defined in terms of proximity in a graph represented by the directory structure such that nodes correspond to directories or files and edges represent a containment relationship. Accordingly, if node N1 is represents a directory and node N2 represents a directory or a file, the graph includes an edge if the node N1 contains the node N2. The system searches for the test directory by traversing the graph representation of the directory structure in the graph neighborhood of the node representing the template directory. For example, the system may traverse a parent node representing a level above the template directory and traverse other child nodes of the parent node. The system may perform a traversal of the graph starting from the parent node, for example, breadth first search or depth first search. The system searches for a directory that has a predetermined name, for example, JTESTS. Alternatively, the system may use any predetermined naming convention or a pattern of directory name to identify the test directory, for example, directory names of the form JTESTS* or JTESTS_*.

According to an embodiment, the system determines that a candidate directory is a test directory for a template directory by comparing the directory structure of the candidate directory with the directory structure of the template directory. If the directory structure of the candidate directory matches the directory structure of the template directory, the candidate directory is determined to have a high likelihood of being the test directory corresponding to the template directory. The system may compare the files in the candidate directory against the files in the template directory. According to an embodiment, the system requires a naming convention for the test file corresponding to a template file. For example, the test file name may be determined by appending a predetermined prefix to the name of the template file. An example prefix is "jtest_" as shown in the examples above. Accordingly, the name of a test file corresponding to a template file is obtained by adding a prefix "jtest_" to the template file name. Furthermore, the extension of the test file may be different compared to the extension of the template file. For example, the extension of the template file may be "j2" whereas the extension of the template file may be "py."

As an example, if the template file name is template1.j2, the corresponding test file is named test_template1.py.

The system compares the directories to determine whether the candidate directory includes test files corresponding to the template files of the template directory. If the candidate directory includes test files corresponding to at least a threshold percentage of template files in the template directory, the system determines that the candidate directory is the test directory corresponding to the template directory.

Accordingly, the system checks 1350 if a candidate directory matches the template directory in terms of the directory structure and based on the fact that it includes test files corresponding to at least a threshold percentage of the template files of the template directory. If the system determines based on the comparison that the candidate directory is a test directory, the system sets 1360 the path of the parent directory of the test directory as the search path for the template directory.

Certain templating engines support several different types of files. For example, a templating engine may support text files with .txt extension, JINJA files with j2 extension, hypertertext markup language (HTML) files with .HTML extension, and so on. Due to the ability of a template engine to process multiple template files types, the system identifies the corresponding file name in the testing framework by comparing the file name without the extension, i.e., independent of the file type. Accordingly, the system automates the process of identifying the template file without explicitly requiring the template file type to be specified. This makes the testing framework highly flexible as it supports the testing of all template file types and streamlines the developer experience.

This is used in the J2Test framework where the unit test file can test any template file type. If the test file is called jtest_<file_name>.py, the corresponding template filename could be <file_name> with any text-based file. For example, the test file jtest_app.py could have any of the corresponding template file types: app.j2, app.html, app.yaml, app.txt, app.xml, app.csv, app.tex, and so on.

According to an embodiment, the system predetermines precedence order between different file types. The system selects a particular type of template file based on the precedence order if there are multiple template file types that match a test file. For example, the system may associate j2 file with higher precedence compared to HTML files and accordingly uses j2 file types as the template files instead of .HTML extension files if both files exist in the candidate directory.

Runtime Execution for Testing

A templating engine may support macros that can be invoked by various templates. Testing these macros ensures code coverage since the macros contain complex logic that must be tested. The system converts the macros to callable entities that can be invoked by test cases.

According to an embodiment, the system identifies templates for use in implementing infrastructure as code (IAC) for managing datacenters configured on a cloud platform. The templates are stored in a template directory in a file system. The templates are configured for processing by a template engine such as JINJA. The system accesses one or more templates from the template directory. The system identifies a set of macros defined in the accessed templates. The system generates a set of callable entities of a programming language, for example, PYTHON. Accordingly, the system converts each macro from the set of macros to a callable entity. The system generates a module in the programming language. The module stores the set of callable entities. The system executes template test cases from the testing directory for testing of the templates. The execution of template test cases is performed by invoking the callable entities corresponding to the macros. If the testing is completed successfully the system executes the template code to generate a set of pipelines configured for implementing the IAC and executes the generated set of pipelines.

Figure 14:
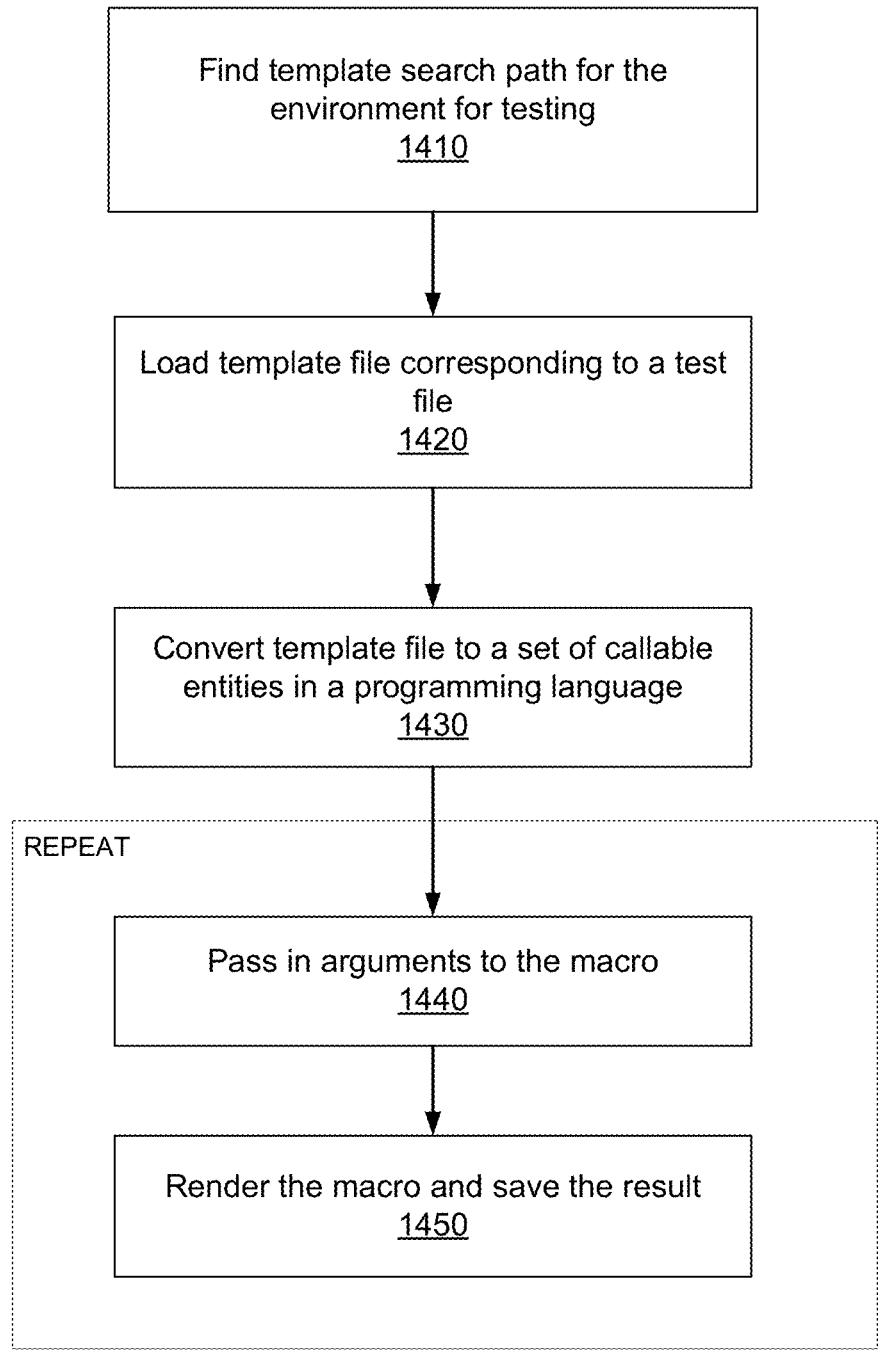
FIG. 14 shows a flowchart illustrating the process for converting macros defined in templates to callable entities for subsequent invocations by test case according to an embodiment.

FIG. 14 shows a flowchart illustrating the process for converting macros defined in templates to callable entities for subsequent invocations by test case according to an embodiment. The steps are indicated as being performed by a system and may be performed by modules of systems, for example, the multi-tenant system 110 and cloud platform 120 as shown in FIG. 1 such as the deployment module 210, the software release management module 230, or the template testing module 390.

The system determines 1410 template search path for the environment for testing of the templates. The search path may be determined using the process shown in FIG. 13. The system loads 1420 a template file corresponding to a test file.

The system converts 1430 the template file into a set of callable entities, for example, functions or methods in a programming language such as PYTHON. According to an embodiment, the system converts the template to a module of the programming language that stores a set of functions and extracts each callable entity by name from the module. The system may store the individual callable entities using a data structure. The ability to convert the macros into callable entity simplifies the process of execution of the tests. Without the ability to call the macros via the callable entities, a developer may have to hard code the macro names in the test cases in several places. Any change in the macro would require corresponding changes in multiple places where the macro is invoked in the test cases.

The system repeats steps 1440 and 1450 for various macros and for various invocation of each macro within each template. The system passes 1440 in the arguments as defined in the test case invoking the macro. The system may perform various checks while passing the arguments, for example, ensuring that the number of arguments passed matches the number of expected arguments for the macro. All macros/functions in a template file can be called for multiple unit tests. The system renders 1450 the macro and saves the result. The macro is rendered by substituting any variables used in the macro definition.

The mechanism disclosed in FIG. 14 allows developers to pass in the macro name and an array as the parameters to be able to run macros easily instead of hardcoding macro calls, thereby providing flexibility for developers.

According to an embodiment, the set of pipelines are configured to deploy a software artifact on datacenter entities of the datacenter configured on the cloud platform. The set of pipelines may be configured to provision resources of the datacenter configured on the cloud platform According to an embodiment, the test directory is identified based on a comparison of names of candidate directories with a predetermined name, for example, JTESTS. The location of the test directory may be determined by performing a traversal of a graph representation of the directory structure.

According to an embodiment, the system matches directory structures of a candidate directory with directory structure of the template directory by comparing names of files in the candidate directory with names of files in the template directory to determine whether a test file exists in the candidate directory corresponding to a template file in the template directory.

A template file has a file type from a plurality of file types, for example, J2, HTML, YAML, TXT, XML, CVS, and so on. The system associates the plurality of file types with a precedence order. Accordingly, the system selects a file of a particular file type as the template file based on the precedence order if the system identifies multiple types of files from the plurality of files in the template directory.

The outputs of templating engine generated by rendering a template by substituting variables with values can be long text strings that may be stored as long text files. This result in the outputs being extremely long. Therefore checking/asserting the output comprising comparing the output against an expected file that is very long. The system uses expected text output files for checking the template test results.

The process of loading files, such as the expected JSON, YAML, or HTML files, is specified relative to the unit test file in J2Test. The system according to an embodiment dynamically converts all file paths stated in a test file to an absolute file path relative to the unit test file location. This simplifies imports of files from anywhere in a consistent manner independent of where the command is executed.

The system executes the following process. A user runs test command in current directory of the test file. The system stores the current directory as the current path. According to an embodiment, the system identifies the directory of the test file and stores the directory of the test file as the current path.

The system performs the following steps for each path specified in the test file. The system identifies a file path specified in the test file that is relative to the test file. For example, the file path may use relative file identifiers such as " . . . /" that refers to the parent directory of the test file. The system joins the file path specified in the test file that is relative to the test file with the current path. This way the system dynamically converts the file path specified in the test file to an absolute path. Note that the user may not specify absolute paths since the absolute path will become specific to the user if the absolute path includes user specific directory names. As a result, if the user specifies an absolute path, the test files would not work if they were copied to a new directory, for example, to another user's directory. Therefore, the system dynamically determines the absolute paths so that if the same test is executed by two different user directories, the system may determine different absolute paths for each user for executing the tests.

The system normalizes the absolute path so that a canonical file path is obtained, and the file path is formatted consistently.

Depending on the testing function executed, the system may read the file and convert the file into a corresponding file type object. For example, if the assert function invoked is assertEqualJsonFile, the system converts the specified file into a JSON (JavaScript object notation) object.

The system dynamically and automatically converts all external file references to absolute file paths, thereby ensuring that the test file runs successfully regardless of the user's command-line directory. Instead, the current path determined by the system is dependent on the test's file location. This is distinct from a test framework in which if a test file is importing a file and the file path is specified relatively, the system resolves the file path relative to the current working directory (i.e., the directory in which the command was run). Such test framework require the tests to be executed from a specific location, e.g., from the base directory of the project for the imports to resolve correctly. To be able to run the tests from any directory, the conventional test frameworks require the file path to be hardcoded as an absolute path. The absolute path to a file may depend on the device, on the user name, the environment, and so on. Therefore such tests fail if run from a different device or from a different user's directory. In contrast, embodiments allow relative paths to be specified and still allow user to run the test cases from any directory.

The system as disclosed allows all load functions to load the files relative to the test file, and not relative to the current working directory. The system dynamically translates the relative path of the file passed in to an absolute file path based on where the test file is located. This ensures that all loads are successful regardless of where the command is run from. This improve usability of the test framework by allowing the test command to be run from anywhere.

Accordingly, the system allows users to issue the test command from anywhere. The system executes the test command such that the test command runs the same independent of where the test is executed from, thereby providing flexibility for the developer. Since the outputs of templates and macros can be extremely complex and long, in many cases the expected output is stored in a separate file and loaded in.

User-Defined Custom Filters

A template engine supports filters that allow the template to transform data stored in variables. Filters can change the format of source data of may generate new data derived from input values. The system according to an embodiment, allows users to provide user-defined filters. A user can specify a folder such as custom_filters to add to the environment dynamically.

Conventional test frameworks throw an error where ever a custom filter is used since that filter is not known by the testing framework. The system allow users to specify custom filters.

The system defines a special folder name that is a keyword, for example, a folder CUSTOM_FILTERS or any other name. This folder is used to store any custom filters the user uses in the template code. This provides flexibility for the user and ensures that the framework can handle any template code. The process for processing user defined custom filters is as follows.

The system creates an environment. The system checks if the custom filters folder is present. If the system determines that the custom_filters folder is present, the system reads all custom filter files from the custom filters folder and adds them to the environment. The system further discovers the template file corresponding to the test file using the techniques disclosed herein. The system loading the custom filters to the environment when the environment is created, to ensure that the filters are available for use when the templates and macros are being rendered.

Template Output Custom Assertion Functions

Unlike conventional unit testing frameworks, the output of templates is usually large files. Therefore, testing the output is performed against an expected output file and by performing comparison of the text. The system according to an embodiment performs relative path resolution to get the relative expected file. The system converts the expected file to the correct type, sorts the data by key, and performs a deep comparison between the two large texts. This allows the system to compare unordered data structures such as sets with no order.

The system simplifies the process for the end-user by extending the functionality of assertion functions that render the template macros before comparing the output to the expected result for different output types (JSON, YAML, String, HTML, and so on). The system performs the following process.

The system renders the macro using the process disclosed herein. The system converts the macro outputs to the correct type. The system may determine the type of the output based on the type of assertion function used since there are custom assertion functions for each of the output types such as JSON, YAML, HTML, etc. Based on the type of assertion function used, the system automatically loads the expected output from a file relative to the test file. The system sorts and sanitizes the result based on the output type before using deep comparison to check if the results match.

This process simplifies the process of testing and allows developers to focus on designing tests instead of writing complex instruction for loading expected outputs, rendering macros, and comparing the values after cleaning the data.

Computer Architecture

Figure 15:
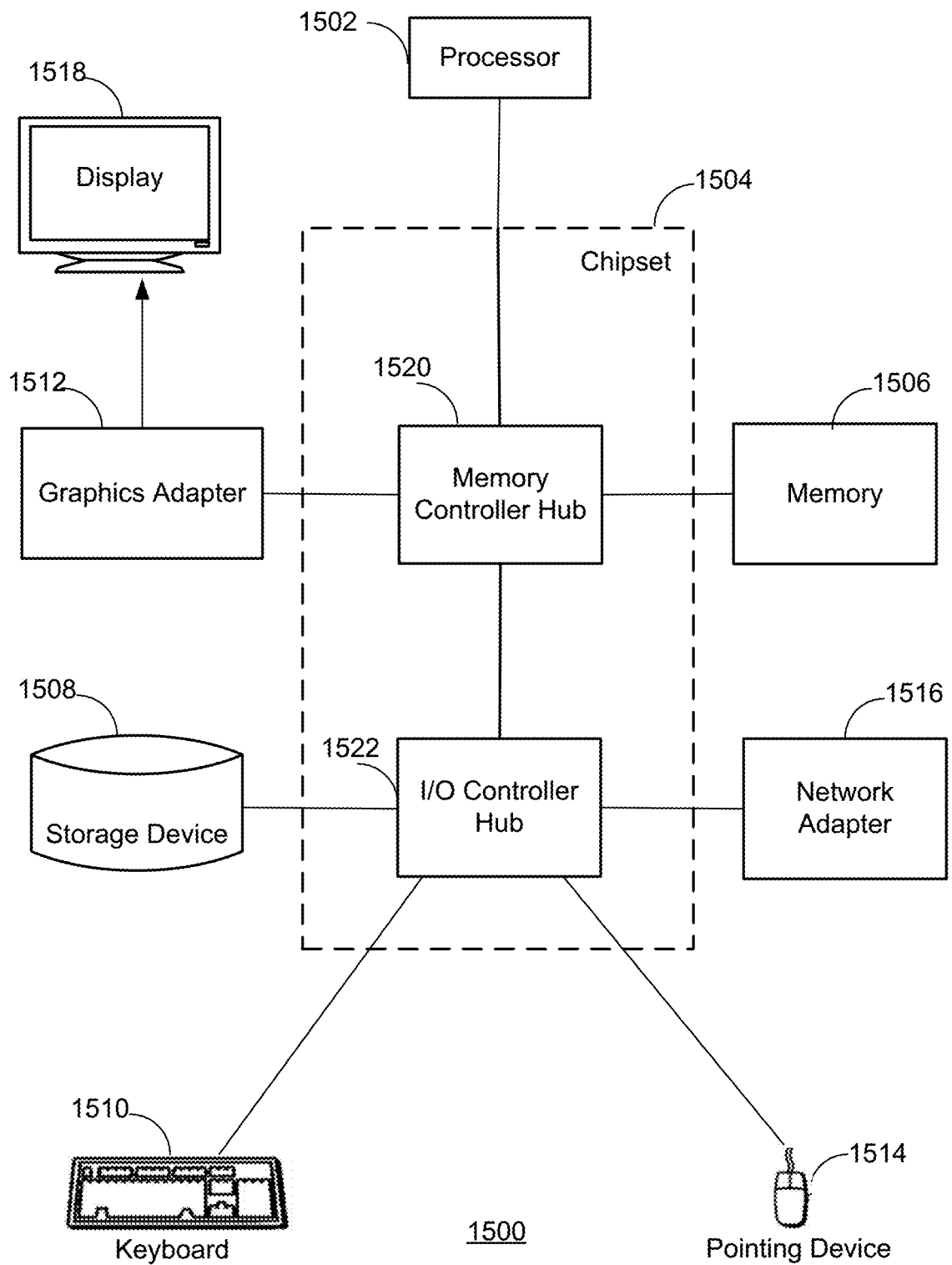
FIG. 15 is a block diagram illustrating a functional view of a typical computer system for use in the environment of FIG. 1 according to one embodiment.

FIG. 15 is a high-level block diagram illustrating a functional view of a typical computer system for use as one of the entities illustrated in the environment 100 of FIG. 1 according to an embodiment. Illustrated are at least one processor 1502 coupled to a chipset 1504. Also coupled to the chipset 1504 are a memory 1506, a storage device 1508, a keyboard 1510, a graphics adapter 1512, a pointing device 1514, and a network adapter 1516. A display 1518 is coupled to the graphics adapter 1512. In one embodiment, the functionality of the chipset 1504 is provided by a memory controller hub 1520 and an I/O controller hub 1522. In another embodiment, the memory 1506 is coupled directly to the processor 1502 instead of the chipset 1504.

The storage device 1508 is a non-transitory computer-readable storage medium, such as a hard drive, compact disk read-only memory (CD-ROM), DVD, or a solid-state memory device. The memory 1506 holds instructions and data used by the processor 1502. The pointing device 1514 may be a mouse, track ball, or other type of pointing device, and is used in combination with the keyboard 1510 to input data into the computer system 200. The graphics adapter 1512 displays images and other information on the display 1518. The network adapter 1516 couples the computer system 1500 to a network.

As is known in the art, a computer 1500 can have different and/or other components than those shown in FIG. 15. In addition, the computer 1500 can lack certain illustrated components. For example, a computer system 1500 acting as a multi-tenant system 110 may lack a keyboard 1510 and a pointing device 1514. Moreover, the storage device 1508 can be local and/or remote from the computer 1500 (such as embodied within a storage area network (SAN)).

The computer 1500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1508, loaded into the memory 1506, and executed by the processor 1502.

The types of computer systems 1500 used by the entities of a system environment can vary depending upon the embodiment and the processing power used by the entity. For example, a client device may be a mobile phone with limited processing power, a small display 1518, and may lack a pointing device 1514. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for generating pipelines for data centers configured on a cloud platform, the method comprising:
    configuring a datacenter on the cloud platform based on a declarative specification specifying a hierarchy of datacenter entities;
    identifying at least one template stored in a template directory in a file system;
    identifying a set of macros defined in the template;
    converting macros in the set of macros to a set of callable entities;
    matching directory structures of candidate directories in the file system with a directory structure of the template directory;
    determining a location of a test directory in the file system as a candidate directory matching the directory structure of the template directory;
    setting a path of the template based on the location of the test directory;
    executing testing code in the test directory for testing the template, wherein executing the testing code invokes the set of callable entities corresponding to the set of macros defined in the template; and
    responsive to successful completion of executing the testing code for testing the template, executing the template to generate a set of pipelines to deploy software artifacts corresponding to the successfully tested template on the datacenter configured on the cloud platform.

2. The computer implemented method of claim 1, wherein the test directory is identified based on a comparison of names of candidate directories with a predetermined name.

3. The computer implemented method of claim 1, wherein determining a location of the test directory comprises performing a traversal of a graph representation of the directory structure of the template directory.

4. The computer implemented method of claim 1, wherein matching a directory structure of a candidate directory with the directory structure of the template directory comprises comparing names of files in the candidate directory with names of files in the template directory to determine whether a test file exists in the candidate directory corresponding to a template file in the template directory.

5. The computer implemented method of claim 1, wherein a template file has a file type from a plurality of file types, the plurality of file types having a precedence order, such that a file of a particular file type is selected as the template file based on the precedence order.

6. The computer implemented method of claim 1, wherein the set of pipelines are configured to deploy a software artifact on the datacenter entities of the datacenter configured on the cloud platform.

7. The computer implemented method of claim 1, wherein the set of pipelines are configured to provision resources of the datacenter configured on the cloud platform.

8. A computer system comprising:
    a computer processor; and
    a non-transitory computer readable storage medium for storing instructions that when executed by the computer processor, cause the computer processor to perform steps for configuring data centers in a cloud platform, the steps comprising;
        configuring a datacenter on the cloud platform based on a declarative specification specifying a hierarchy of datacenter entities;
        identifying at least one template stored in a template directory in a file system;
        identifying a set of macros defined in the template;
        converting macros in the set of macros to a set of callable entities;
        matching directory structures of candidate directories in the file system with directory structure of the template directory;
        determining a location of a test directory in the file system as a candidate directory matching the directory structure of the template directory;
        setting a path of the template based on the location of the test directory;
        executing testing code in the test directory for testing the template, wherein executing the testing code invokes the set of callable entities corresponding to the set of macros defined in the template; and
        responsive to successful completion of executing the testing code for testing the template, executing the template to generate a set of pipelines to deploy software artifacts corresponding to the successfully tested template on the datacenter configured on the cloud platform.

9. The computer system of claim 8, wherein the test directory is identified based on a comparison of names of candidate directories with a predetermined name.

10. The computer system of claim 8, wherein determining a location of the test directory comprises performing a traversal of a graph representation of the directory structure of the template directory.

11. The computer system of claim 8, wherein matching a directory structure of a candidate directory with the directory structure of the template directory comprises comparing names of files in the candidate directory with names of files in the template directory to determine whether a test file exists in the candidate directory corresponding to a template file in the template directory.

12. The computer system of claim 8, wherein a template file has a file type from a plurality of file types, the plurality of file types having a precedence order, such that a file of a particular file type is selected as the template file based on the precedence order.

13. The computer system of claim 8, wherein the set of pipelines are configured to deploy a software artifact on the datacenter entities of the datacenter configured on the cloud platform or to provision resources of the datacenter configured on the cloud platform.

14. A non-transitory computer-readable medium having instructions stored thereon that are capable of causing a computer system to implement operations comprising:

configuring a datacenter on a cloud platform based on a declarative specification specifying a hierarchy of datacenter entities;

identifying at least one template stored in a template directory in a file system;

identifying a set of macros defined in the template;

converting macros in the set of macros to a set of callable entities;

matching directory structures of candidate directories in the file system with directory structure of the template directory;

determining a location of a test directory in the file system as a candidate directory matching the directory structure of the template directory;

setting a path of the template based on the location of the test directory;

executing testing code in the test directory for testing the template, wherein executing the testing code invokes the set of callable entities corresponding to the set of macros defined in the template; and responsive to successful completion of executing the testing code for testing the template, executing the template to generate a set of pipelines to deploy software artifacts corresponding to the successfully tested template on the datacenter configured on the cloud platform.

15. The non-transitory computer-readable medium of claim 14, wherein the test directory is identified based on a comparison of names of candidate directories with a predetermined name.

16. The non-transitory computer-readable medium of claim 14, wherein determining the location of the test directory comprises performing a traversal of a graph representation of the directory structure of the template directory.

17. The non-transitory computer-readable medium of claim 14, wherein matching a directory structure of a candidate directory with the directory structure of the template directory comprises comparing names of files in the candidate directory with names of files in the template directory to determine whether a test file exists in the candidate directory corresponding to a template file in the template directory.

18. The non-transitory computer-readable medium of claim 14, wherein a template file has a file type from a plurality of file types, the plurality of file types having a precedence order, such that a file of a particular file type is selected as the template file based on the precedence order.

19. The non-transitory computer-readable medium of claim 14, wherein the set of callable entities correspond to a programming language of the template, and wherein the operations further comprise:

generating a module in the programming language, the module storing the set of callable entities, wherein executing the testing code invokes the set of callable entities by executing the module.

20. The non-transitory computer-readable medium of claim 14, wherein the set of pipelines are configured to provision resources of the datacenter configured on the cloud platform.

\* \* \* \* \*